(12) United States Patent
Yang

(10) Patent No.: US 10,214,197 B2
(45) Date of Patent: Feb. 26, 2019

(54) HYBRID ELECTRIC VEHICLE, METHOD AND APPARATUS FOR CONTROLLING OPERATION MODE OF THE SAME

(71) Applicant: BORGWARD TRADEMARK HOLDINGS GmbH, Stuttgart (DE)

(72) Inventor: Weibin Yang, Beijing (CN)

(73) Assignee: BORGWARD TRADEMARK HOLDINGS GMBH, Stuttgart (DE)

( * ) Notice: Subject to any disclaimer, the term of this patent is extended or adjusted under 35 U.S.C. 154(b) by 280 days.

(21) Appl. No.: 15/210,823

(22) Filed: Jul. 14, 2016

(65) Prior Publication Data

US 2017/0036664 A1 Feb. 9, 2017

(30) Foreign Application Priority Data

Aug. 4, 2015 (DE) .................... 10 2015 214 886

(51) Int. Cl.
*B60W 10/08* (2006.01)
*B60W 50/00* (2006.01)
(Continued)

(52) U.S. Cl.
CPC ............. *B60W 10/08* (2013.01); *B60K 6/48* (2013.01); *B60W 10/02* (2013.01); *B60W 10/06* (2013.01);
(Continued)

(58) Field of Classification Search
CPC ......... B60K 6/48; B60W 10/02; B60W 10/06; B60W 20/20; B60W 50/0097; B60W 50/0098
(Continued)

(56) References Cited

U.S. PATENT DOCUMENTS 5,804,947 A * 9/1998 Nii ..................... B60K 6/46
318/153
2007/0112496 A1* 5/2007 Ji ..................... B60K 6/445
701/70

FOREIGN PATENT DOCUMENTS

CN 101804810 * 8/2010
CN 101804810 A 8/2010
(Continued)

OTHER PUBLICATIONS

CN-101804810-Cover; Aug. 2010, China.*

*Primary Examiner* — Muhammad Shafi
(74) *Attorney, Agent, or Firm* — Tucker Ellis LLP

(57) ABSTRACT

A method and an apparatus for controlling an operation mode of a hybrid electric vehicle and a hybrid electric vehicle are provided in the present disclosure. The method includes: detecting a current state of charge of a power battery and an expected torque at wheels in the hybrid electric vehicle; maintaining a current operation mode of the hybrid electric vehicle, if it is detected that the current state of charge enters a state hysteresis area or the expected torque at wheels enters a torque hysteresis area; obtaining a duration of the current operation mode and determining a next operation mode of the hybrid electric vehicle according to the duration, the current state of charge and the expected torque at wheels, if it is detected that the current state of charge exits the state hysteresis area and the expected torque at wheels exits the torque hysteresis area. With the method, the problems of frequently switching from one operation mode to another operation mode may be avoided, the comprehensive performance of the hybrid electric vehicle and the fuel economy may be improved, and the user experience may be enhanced.

21 Claims, 4 Drawing Sheets

(51) Int. Cl.
  *B60W 10/02* (2006.01)
  *B60W 10/06* (2006.01)
  *B60K 6/48* (2007.10)
  *B60W 20/20* (2016.01)
  *B60K 6/52* (2007.10)

(52) U.S. Cl.
  CPC ........ *B60W 20/20* (2013.01); *B60W 50/0097* (2013.01); *B60W 50/0098* (2013.01); *B60K 6/52* (2013.01); *B60W 2510/244* (2013.01); *B60W 2720/30* (2013.01); *Y02T 10/6221* (2013.01); *Y02T 10/6265* (2013.01); *Y02T 10/6286* (2013.01); *Y10S 903/916* (2013.01); *Y10S 903/93* (2013.01)

(58) Field of Classification Search
  USPC .......................................................... 701/22
  See application file for complete search history.

(56) References Cited

FOREIGN PATENT DOCUMENTS

| | | | |
|---|---|---|---|
| CN | 102431550 | A | 5/2012 |
| CN | 103158695 | A | 6/2013 |
| CN | 104149777 | A | 11/2014 |
| EP | 2289750 | A | 3/2011 |
| JP | 2011-57115 | A | 3/2011 |
| WO | WO2010144042 | A | 12/2010 |

* cited by examiner

HYBRID ELECTRIC VEHICLE, METHOD AND APPARATUS FOR CONTROLLING OPERATION MODE OF THE SAME

RELATED APPLICATIONS

This application claims priority to German Patent Application No. 102015214886.6 filed Aug. 4, 2015, which is hereby incorporated herein by reference.

FIELD

The present disclosure relates to the field of hybrid electric vehicle technologies, and more particularly, to a method for controlling an operation mode of a hybrid electric vehicle and an apparatus for controlling an operation mode of a hybrid electric vehicle and a hybrid electric vehicle.

BACKGROUND

In the methods for controlling an operation mode of a hybrid electric vehicle in the related art, possible operation modes and conditions of switching from one operation mode to another operation mode are provided and then the hybrid electric vehicle is switched from one operation mode to another operation mode according to the conditions. However, there are following problems in the related art. (1) Problems of frequently switching from one operation mode to another operation mode are not considered. For example, when only using a state of charge (SOC) and an expected torque as controlling parameters, if the methods for controlling an operation mode in the related art are adopted, it may result in faults of continuously switching among some operation modes. (2) The SOC is controlled simply by only considering general operation conditions without considering a vehicle starting process. For example, during the vehicle starting process, if the SOC is slightly lower than a target value, a pure motor operation condition may be adopted and the vehicle has a good comprehensive performance at this moment. If the SOC is far lower than the target value, the pure motor operation condition cannot be adopted to avoid a fault that the battery is under charge. However, this phenomenon is not taken into account in the related art. (3) At present, the conditions of switching from one operation mode to another operation mode are constant, which cannot be calibrated and even goes against an actual vehicle calibration. For example, the changing of the operation mode may result in an operating efficiency of an engine improving and the power consumption increasing. In some operation conditions, although the operating efficiency of the engine is improved significantly, fuel economy of the vehicle is poor due to the increase of power consumption of a battery and a motor. Thus, during a process of determining threshold values, the increase of power consumption and the improvement of operating efficiency should be considered comprehensively. However, it is not taken into account in the related art, either. (4) The consideration is not comprehensive. The methods for controlling an operation mode in the related art provide ten or more operation modes. Since there are so many operation modes, it is hard to judge whether these operation modes can be distributed properly in a coordinate plane of the SOC and the expected torque, among which operation modes the vehicle may be switched and whether the specific switching conditions are correct or not, which resulting in the vehicle failing to operate in the optimal state in real-time and affecting the fuel economy of the vehicle.

SUMMARY

Embodiments of a first aspect of the present disclosure provide a method for controlling an operation mode of a hybrid electric vehicle. The method includes: detecting a current state of charge of a power battery and an expected torque at wheels in the hybrid electric vehicle; maintaining a current operation mode of the hybrid electric vehicle, if it is detected that the current state of charge enters a state hysteresis area or the expected torque at wheels enters a torque hysteresis area; obtaining a duration of the current operation mode and determining a next operation mode of the hybrid electric vehicle according to the duration, the current state of charge and the expected torque at wheels, if it is detected that the current state of charge exits the state hysteresis area and the expected torque at wheels exits the torque hysteresis area.

In some embodiments, the determining a next operation mode of the hybrid electric vehicle according to the duration, the current state of charge and the expected torque at wheels includes: judging whether the duration exceeds a preset period; maintaining continually the current operation mode if the duration does not exceed the preset period; determining the next operation mode according to the current state of charge and the expected torque at wheels and switching to the next operation mode if the duration exceeds the preset period.

In some embodiments, the hybrid electric vehicle is a parallel hybrid electric vehicle and a power assembly of the parallel hybrid electric vehicle includes an engine, an automatic clutch, a motor, an automatic mechanical transmission and a main reducer.

In some embodiments, operation modes of the parallel hybrid electric vehicle include a pure motor mode, a pure engine mode, a first mode with the motor driving and the engine operating at a fuel economy tending to an optimum fuel economy, a second mode with the motor driving and the engine operating at a maximum power, a third mode with the motor generating electricity and the engine operating at the fuel economy tending to the optimum fuel economy, a fourth mode with the engine operating at the maximum power, wherein the determining the next operation mode according to the current state of charge and the expected torque at wheels includes:

determining the pure motor mode as the next operation mode if the current state of charge is greater than a first preset state of charge threshold and the expected torque at wheels is less than a first preset torque;

determining the pure engine mode as the next operation mode if the current state of charge is greater than the first preset state of charge threshold and the expected torque at wheels is greater than a second preset torque and less than a third preset torque;

determining the first mode as the next operation mode if the current state of charge is greater than the first preset state of charge threshold and the expected torque at wheels is greater than a fourth preset torque and less than a fifth preset torque;

determining the second mode as the next operation mode if the current state of charge is greater than the first preset state of charge threshold and the expected torque at wheels is greater than a sixth preset torque;

determining the pure motor mode as the next operation mode if the current state of charge is greater than a third preset state of charge threshold and less than a second preset state of charge threshold and the expected torque at wheels is less than a seventh preset torque;

determining the third mode as the next operation mode if the current state of charge is greater than the third preset state of charge threshold and less than the second preset state of charge threshold and the expected torque at wheels is greater than an eighth preset torque and less than a ninth preset torque;

determining the pure engine mode as the next operation mode if the current state of charge is greater than the third preset state of charge threshold and less than the second preset state of charge threshold and the expected torque at wheels is greater than a tenth preset torque and less than an eleventh preset torque;

determining the second mode as the next operation mode if the current state of charge is greater than the third preset state of charge threshold and less than the second preset state of charge threshold and the expected torque at wheels is greater than a twelfth preset torque;

determining the third mode as the next operation mode if the current state of charge is less than a fourth preset state of charge threshold and the expected torque at wheels is less than a thirteenth preset torque;

determining the pure engine mode as the next operation mode if the current state of charge is less than the fourth preset state of charge threshold and the expected torque at wheels is greater than a fourteenth preset torque and less than a fifteenth preset torque;

determining the fourth mode as the next operation mode if the current state of charge is less than the fourth preset state of charge threshold and the expected torque at wheels is greater than a sixteenth preset torque;

wherein the first preset state of charge threshold is greater than the second preset state of charge threshold, the third preset state of charge threshold is greater than the fourth preset state of charge threshold; the first preset torque is less than the second preset torque, the third preset torque is less than the fourth preset torque, the fifth preset torque is less than the sixth preset torque, the seventh preset torque is less than the eighth preset torque, the ninth preset torque is less than the tenth preset torque, the eleventh preset torque is less than the twelfth preset torque, the thirteenth preset torque is less than the fourteenth preset torque, and the fifteenth preset torque is less than the sixteenth preset torque.

In some embodiments, the first preset state of charge threshold, the second preset state of charge threshold, the third preset state of charge threshold and the fourth preset state of charge threshold are respectively determined according to a capacity and a type of the power battery in the parallel hybrid electric vehicle; the first preset torque, the second preset torque, the third preset torque, the fourth preset torque, the fifth preset torque, the sixth preset torque, the seventh preset torque, the eighth preset torque, the ninth preset torque, the tenth preset torque, the eleventh preset torque, the twelfth preset torque, the thirteenth preset torque, the fourteenth preset torque, the fifteenth preset torque and the sixteenth preset torque are respectively determined by performing an actual vehicle calibration according to maximum torque characteristics of the motor, a wheel radius, a transmission efficiency, each gear ratio and a speed ratio of the main reducer.

In some embodiments, the hybrid electric vehicle is a four-wheel drive hybrid electric vehicle, in which a front axle assembly of the four-wheel drive hybrid electric vehicle includes an engine, an integrated starter generator, an automatic transmission assembly and a first differential; a rear axle assembly of the four-wheel drive hybrid electric vehicle includes a rear-wheel drive motor, a single-stage reducer and a second differential.

In some embodiments, operation modes of the four-wheel drive hybrid electric vehicle include a pure rear-wheel drive motor mode, a pure engine mode, a fifth mode with the rear-wheel drive motor driving and the engine operating at a fuel economy tending to an optimum fuel economy, a sixth mode with the rear-wheel drive motor and the integrated starter generator driving and the engine operating at the fuel economy tending to the optimum fuel economy, a series mode, a seventh mode with the integrated starter generator generating electricity and the engine operating at the fuel economy tending to the optimum fuel economy, an eighth mode with the rear-wheel drive motor driving and the engine operating at a maximum power, a ninth mode with the rear-wheel drive motor and the integrated starter generator driving and the engine operating at the maximum power and a tenth mode with the engine operating at the maximum power, wherein the determining the next operation mode according to the current state of charge and the expected torque at wheels includes:

determining the pure rear-wheel drive motor mode as the next operation mode if the current state of charge is greater than a fifth preset state of charge threshold and the expected torque at wheels is less than a twenty-first preset torque;

determining the pure engine mode as the next operation mode if the current state of charge is greater than the fifth preset state of charge threshold and the expected torque at wheels is greater than a twenty-second preset torque and less than a twenty-third preset torque;

determining the fifth mode as the next operation mode if the current state of charge is greater than the fifth preset state of charge threshold and the expected torque at wheels is greater than a twenty-fourth preset torque and less than a twenty-fifth preset torque;

determining the sixth mode as the next operation mode if the current state of charge is greater than the fifth preset state of charge threshold and the expected torque at wheels is greater than a twenty-sixth preset torque;

determining the pure rear-wheel drive motor mode or the series mode as the next operation mode if the current state of charge is greater than a seventh preset state of charge threshold and less than a sixth preset state of charge threshold and the expected torque at wheels is less than a twenty-seventh preset torque;

determining the seventh mode as the next operation mode if the current state of charge is greater than the seventh preset state of charge threshold and less than the sixth preset state of charge threshold and the expected torque at wheels is greater than a twenty-eighth preset torque and less than a twenty-ninth preset torque;

determining the pure engine mode as the next operation mode if the current state of charge is greater than the seventh preset state of charge threshold and less than the sixth preset state of charge threshold and the expected torque at wheels is greater than a thirtieth preset torque and less than a thirty-first preset torque;

determining the eighth mode as the next operation mode if the current state of charge is greater than the seventh preset state of charge threshold and less than the sixth preset state of charge threshold and the expected torque at wheels is greater than a thirty-second preset torque and less than a thirty-third preset torque;

determining the ninth mode as the next operation mode if the current state of charge is greater than the seventh preset state of charge threshold and less than the sixth preset state of charge threshold and the expected torque at wheels is greater than a thirty-fourth preset torque;

determining the series mode as the next operation mode if the current state of charge is less than an eighth preset state of charge threshold and the expected torque at wheels is less than a thirty-fifth preset torque;

determining the seventh mode as the next operation mode if the current state of charge is less than the eighth preset state of charge threshold and the expected torque at wheels is greater than a thirty-sixth preset torque and less than a thirty-seventh preset torque;

determining the pure engine mode as the next operation mode if the current state of charge is less than the eighth preset state of charge threshold and the expected torque at wheels is greater than a thirty-eighth preset torque and less than a thirty-ninth preset torque;

determining the tenth mode as the next operation mode if the current state of charge is less than the eighth preset state of charge threshold and the expected torque at wheels is greater than a fortieth preset torque;

wherein the fifth preset state of charge threshold is greater than the sixth preset state of charge threshold, the seventh preset state of charge threshold is greater than the eighth preset state of charge threshold; the twenty-first preset torque is less than the twenty-second preset torque, the twenty-third preset torque is less than the twenty-fourth preset torque, the twenty-fifth preset torque is less than the twenty-sixth preset torque, the twenty-seventh preset torque is less than the twenty-eighth preset torque, the twenty-ninth preset torque is less than the thirtieth preset torque, the thirty-first preset torque is less than the thirty-second preset torque, the thirty-third preset torque is less than the thirty-fourth preset torque, the thirty-fifth preset torque is less than the thirty-sixth preset torque, the thirty-seventh preset torque is less than the thirty-eighth preset torque, and the thirty-ninth preset torque is less than the fortieth preset torque.

In some embodiments, the fifth preset state of charge threshold, the sixth preset state of charge threshold, the seventh preset state of charge threshold and the eighth preset state of charge threshold are respectively determined according to a capacity and a type of the power battery in the four-wheel drive hybrid electric vehicle; the twenty-first preset torque, the twenty-second preset torque, the twenty-third preset torque, the twenty-fourth preset torque, the twenty-fifth preset torque, the twenty-sixth preset torque, the twenty-seventh preset torque, the twenty-eighth preset torque, the twenty-ninth preset torque, the thirtieth preset torque, the thirty-first preset torque, the thirty-second preset torque, the thirty-third preset torque, the thirty-fourth preset torque, the thirty-fifth preset torque, the thirty-sixth preset torque, the thirty-seventh preset torque, the thirty-eighth preset torque, the thirty-ninth preset torque and the fortieth preset torque are respectively determined by performing an actual vehicle calibration according to maximum torque characteristics of the rear-wheel drive motor, a wheel radius, a transmission efficiency, each gear ratio and a speed ratio of a main reducer.

Embodiments of a second aspect of the present disclosure provide an apparatus for controlling an operation mode of a hybrid electric vehicle. The apparatus includes: a detecting module, configured to detect a current state of charge of a power battery and an expected torque at wheels in the hybrid electric vehicle; a first controlling module, configured to maintain a current operation mode of the hybrid electric vehicle if the detecting module detects that the current state of charge enters a state hysteresis area or the expected torque at wheels enters a torque hysteresis area; a second controlling module, configured to obtain a duration of the current operation mode and determine a next operation mode of the hybrid electric vehicle according to the duration, the current state of charge and the expected torque at wheels if the detecting module detects that the current state of charge exits the state hysteresis area and the expected torque at wheels exits the torque hysteresis area.

In some embodiments, the second controlling module includes: a judging unit, configured to judge whether the duration exceeds a preset period; a maintaining unit, configured to maintain continually the current operation mode if the judging unit judges that the duration does not exceed the preset period; a switching unit, configured to determine the next operation mode according to the current state of charge and the expected torque at wheels and to switch to the next operation mode, if the judging unit judges that the duration exceeds the preset period.

In some embodiments, the hybrid electric vehicle is a parallel hybrid electric vehicle and a power assembly of the parallel hybrid electric vehicle includes an engine, an automatic clutch, a motor, an automatic mechanical transmission and a main reducer.

In some embodiments, operation modes of the parallel hybrid electric vehicle include a pure motor mode, a pure engine mode, a first mode with the motor driving and the engine operating at a fuel economy tending to an optimum fuel economy, a second mode with the motor driving and the engine operating at a maximum power, a third mode with the motor generating electricity and the engine operating at the fuel economy tending to the optimum fuel economy, a fourth mode with the engine operating at the maximum power, wherein the switching unit is further configured to:

determine the pure motor mode as the next operation mode if the current state of charge is greater than a first preset state of charge threshold and the expected torque at wheels is less than a first preset torque;

determine the pure engine mode as the next operation mode if the current state of charge is greater than the first preset state of charge threshold and the expected torque at wheels is greater than a second preset torque and less than a third preset torque;

determine the first mode as the next operation mode if the current state of charge is greater than the first preset state of charge threshold and the expected torque at wheels is greater than a fourth preset torque and less than a fifth preset torque;

determine the second mode as the next operation mode if the current state of charge is greater than the first preset state of charge threshold and the expected torque at wheels is greater than a sixth preset torque;

determine the pure motor mode as the next operation mode if the current state of charge is greater than a third preset state of charge threshold and less than a second preset state of charge threshold and the expected torque at wheels is less than a seventh preset torque;

determine the third mode as the next operation mode if the current state of charge is greater than the third preset state of charge threshold and less than the second preset state of charge threshold and the expected torque at wheels is greater than an eighth preset torque and less than a ninth preset torque;

determine the pure engine mode as the next operation mode if the current state of charge is greater than the third preset state of charge threshold and less than the second preset state of charge threshold and the expected torque at wheels is greater than a tenth preset torque and less than an eleventh preset torque;

determine the second mode as the next operation mode if the current state of charge is greater than the third preset state of charge threshold and less than the second preset state of charge threshold and the expected torque at wheels is greater than a twelfth preset torque;

determine the third mode as the next operation mode if the current state of charge is less than a fourth preset state of charge threshold and the expected torque at wheels is less than a thirteenth preset torque;

determine the pure engine mode as the next operation mode if the current state of charge is less than the fourth preset state of charge threshold and the expected torque at wheels is greater than a fourteenth preset torque and less than a fifteenth preset torque;

determine the fourth mode as the next operation mode if the current state of charge is less than the fourth preset state of charge threshold and the expected torque at wheels is greater than a sixteenth preset torque;

wherein the first preset state of charge threshold is greater than the second preset state of charge threshold, the third preset state of charge threshold is greater than the fourth preset state of charge threshold; the first preset torque is less than the second preset torque, the third preset torque is less than the fourth preset torque, the fifth preset torque is less than the sixth preset torque, the seventh preset torque is less than the eighth preset torque, the ninth preset torque is less than the tenth preset torque, the eleventh preset torque is less than the twelfth preset torque, the thirteenth preset torque is less than the fourteenth preset torque, and the fifteenth preset torque is less than the sixteenth preset torque.

In some embodiments, the first preset state of charge threshold, the second preset state of charge threshold, the third preset state of charge threshold and the fourth preset state of charge threshold are respectively determined according to a capacity and a type of the power battery in the parallel hybrid electric vehicle; the first preset torque, the second preset torque, the third preset torque, the fourth preset torque, the fifth preset torque, the sixth preset torque, the seventh preset torque, the eighth preset torque, the ninth preset torque, the tenth preset torque, the eleventh preset torque, the twelfth preset torque, the thirteenth preset torque, the fourteenth preset torque, the fifteenth preset torque and the sixteenth preset torque are respectively determined by performing an actual vehicle calibration according to maximum torque characteristics of the motor, a wheel radius, a transmission efficiency, each gear ratio and a speed ratio of the main reducer.

In some embodiments, the hybrid electric vehicle is a four-wheel drive hybrid electric vehicle, in which a front axle assembly of the four-wheel drive hybrid electric vehicle includes an engine, an integrated starter generator, an automatic transmission assembly and a first differential; a rear axle assembly of the four-wheel drive hybrid electric vehicle includes a rear-wheel drive motor, a single-stage reducer and a second differential.

In some embodiments, operation modes of the four-wheel drive hybrid electric vehicle include a pure rear-wheel drive motor mode, a pure engine mode, a fifth mode with the rear-wheel drive motor driving and the engine operating at a fuel economy tending to an optimum fuel economy, a sixth mode with the rear-wheel drive motor and the integrated starter generator driving and the engine operating at the fuel economy tending to the optimum fuel economy, a series mode, a seventh mode with the integrated starter generator generating electricity and the engine operating at the fuel economy tending to the optimum fuel economy, an eighth mode with the rear-wheel drive motor driving and the engine operating at a maximum power, a ninth mode with the rear-wheel drive motor and the integrated starter generator driving and the engine operating at the maximum power and a tenth mode with the engine operating at the maximum power, wherein the switching unit is further configured to:

determine the pure rear-wheel drive motor mode as the next operation mode if the current state of charge is greater than a fifth preset state of charge threshold and the expected torque at wheels is less than a twenty-first preset torque;

determine the pure engine mode as the next operation mode if the current state of charge is greater than the fifth preset state of charge threshold and the expected torque at wheels is greater than a twenty-second preset torque and less than a twenty-third preset torque;

determine the fifth mode as the next operation mode if the current state of charge is greater than the fifth preset state of charge threshold and the expected torque at wheels is greater than a twenty-fourth preset torque and less than a twenty-fifth preset torque;

determine the sixth mode as the next operation mode if the current state of charge is greater than the fifth preset state of charge threshold and the expected torque at wheels is greater than a twenty-sixth preset torque;

determine the pure rear-wheel drive motor mode or the series mode as the next operation mode if the current state of charge is greater than a seventh preset state of charge threshold and less than a sixth preset state of charge threshold and the expected torque at wheels is less than a twenty-seventh preset torque;

determine the seventh mode as the next operation mode if the current state of charge is greater than the seventh preset state of charge threshold and less than the sixth preset state of charge threshold and the expected torque at wheels is greater than a twenty-eighth preset torque and less than a twenty-ninth preset torque;

determine the pure engine mode as the next operation mode if the current state of charge is greater than the seventh preset state of charge threshold and less than the sixth preset state of charge threshold and the expected torque at wheels is greater than a thirtieth preset torque and less than a thirty-first preset torque;

determine the eighth mode as the next operation mode if the current state of charge is greater than the seventh preset state of charge threshold and less than the sixth preset state of charge threshold and the expected torque at wheels is greater than a thirty-second preset torque and less than a thirty-third preset torque;

determine the ninth mode as the next operation mode if the current state of charge is greater than the seventh preset state of charge threshold and less than the sixth preset state of charge threshold and the expected torque at wheels is greater than a thirty-fourth preset torque;

determine the series mode as the next operation mode if the current state of charge is less than an eighth preset state of charge threshold and the expected torque at wheels is less than a thirty-fifth preset torque;

determine the seventh mode as the next operation mode if the current state of charge is less than the eighth preset state of charge threshold and the expected torque at wheels is greater than a thirty-sixth preset torque and less than a thirty-seventh preset torque;

determine the pure engine mode as the next operation mode if the current state of charge is less than the eighth preset state of charge threshold and the expected torque at wheels is greater than a thirty-eighth preset torque and less than a thirty-ninth preset torque;

determine the tenth mode as the next operation mode if the current state of charge is less than the eighth preset state of charge threshold and the expected torque at wheels is greater than a fortieth preset torque;

wherein the fifth preset state of charge threshold is greater than the sixth preset state of charge threshold, the seventh preset state of charge threshold is greater than the eighth preset state of charge threshold; the twenty-first preset torque is less than the twenty-second preset torque, the twenty-third preset torque is less than the twenty-fourth preset torque, the twenty-fifth preset torque is less than the twenty-sixth preset torque, the twenty-seventh preset torque is less than the twenty-eighth preset torque, the twenty-ninth preset torque is less than the thirtieth preset torque, the thirty-first preset torque is less than the thirty-second preset torque, the thirty-third preset torque is less than the thirty-fourth preset torque, the thirty-fifth preset torque is less than the thirty-sixth preset torque, the thirty-seventh preset torque is less than the thirty-eighth preset torque, and the thirty-ninth preset torque is less than the fortieth preset torque.

In some embodiments, the fifth preset state of charge threshold, the sixth preset state of charge threshold, the seventh preset state of charge threshold and the eighth preset state of charge threshold are respectively determined according to a capacity and a type of the power battery in the four-wheel drive hybrid electric vehicle; the twenty-first preset torque, the twenty-second preset torque, the twenty-third preset torque, the twenty-fourth preset torque, the twenty-fifth preset torque, the twenty-sixth preset torque, the twenty-seventh preset torque, the twenty-eighth preset torque, the twenty-ninth preset torque, the thirtieth preset torque, the thirty-first preset torque, the thirty-second preset torque, the thirty-third preset torque, the thirty-fourth preset torque, the thirty-fifth preset torque, the thirty-sixth preset torque, the thirty-seventh preset torque, the thirty-eighth preset torque, the thirty-ninth preset torque and the fortieth preset torque are respectively determined by performing an actual vehicle calibration according to maximum torque characteristics of the rear-wheel drive motor, a wheel radius, a transmission efficiency, each gear ratio and a speed ratio of a main reducer.

Embodiments of a third aspect of the present disclosure provide a hybrid electric vehicle, including the apparatus for controlling an operation mode of a hybrid electric vehicle according to the second aspect of the present disclosure.

The technical solutions according to embodiments of the present disclosure may have advantageous effects as follows. (1) The operation mode may be determined by adopting four controlling parameters, i.e. the current state of charge, the expected torque at wheels, the current operation mode and the duration of the current operation mode, in which the problems of frequently switching from one operation mode to another operation mode may be avoided by adopting two controlling parameters, i.e. the current operation mode and the duration of the current operation mode. (2) During a process of controlling the current state of charge, both general operating conditions and the vehicle starting process are taken into account. During the vehicle starting process, if the current state of charge is slightly lower than the target value, the pure motor operating conditions may be adopted and the vehicle has the good comprehensive performance at this moment; if the current state of charge is far lower than the target value, the pure motor operating conditions cannot be adopted to avoid the fault that the battery is under charge. (3) The conditions of switching from one operation mode to another operation mode can be calibrated easily, which is conducive to the actual vehicle calibration, and by performing the actual vehicle calibration a balance of increasing the power consumption and improving the operating efficiency may be found, thus improving the fuel economy of the vehicle. (4) The consideration is comprehensive, which ensures that the operation modes may be distributed properly in the coordinate plane of the state of charge and the expected torque and the switching conditions are easy to determine.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
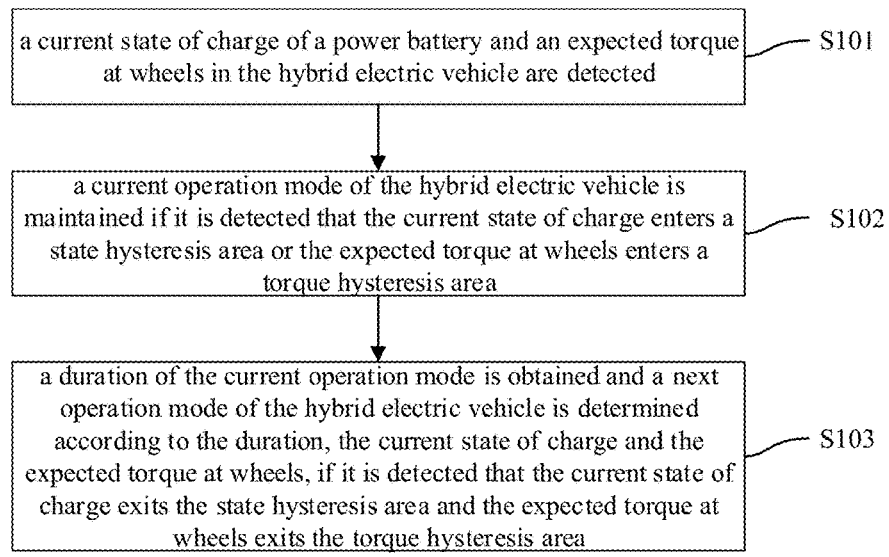
FIG. 1 is a flow chart of a method for controlling an operation mode of a hybrid electric vehicle according to an embodiment of the present disclosure.

Reference will be made in detail to embodiments of the present disclosure, wherein the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A method and an apparatus for controlling an operation mode of a hybrid electric vehicle, a parallel hybrid electric vehicle and a four-wheel drive hybrid electric according to embodiments of the present disclosure will be described as follows with reference to accompanying drawings.

FIG. 1 is a flow chart of a method for controlling an operation mode of a hybrid electric vehicle according to an embodiment of the present disclosure. As shown in FIG. 1, the method for controlling an operation mode of a hybrid electric vehicle includes following steps.

In step S101, a current state of charge of a power battery and an expected torque at wheels in the hybrid electric vehicle are detected.

Specifically, when the hybrid electric vehicle is under a driving condition, the current state of charge and the expected torque at wheels may be detected in real-time.

It should be noted that, the method according to embodiments of the present disclosure is suitable for the driving condition. When detecting a braking signal, the hybrid electric vehicle may be switched between a current operation mode and a braking mode in real-time.

In step S102, a current operation mode of the hybrid electric vehicle is maintained if it is detected that the current state of charge enters a state hysteresis area or the expected torque at wheels enters a torque hysteresis area.

In step S103, a duration of the current operation mode is obtained and a next operation mode of the hybrid electric vehicle is determined according to the duration, the current state of charge and the expected torque at wheels, if it is detected that the current state of charge exits the state hysteresis area and the expected torque at wheels exits the torque hysteresis area.

Figure 2:
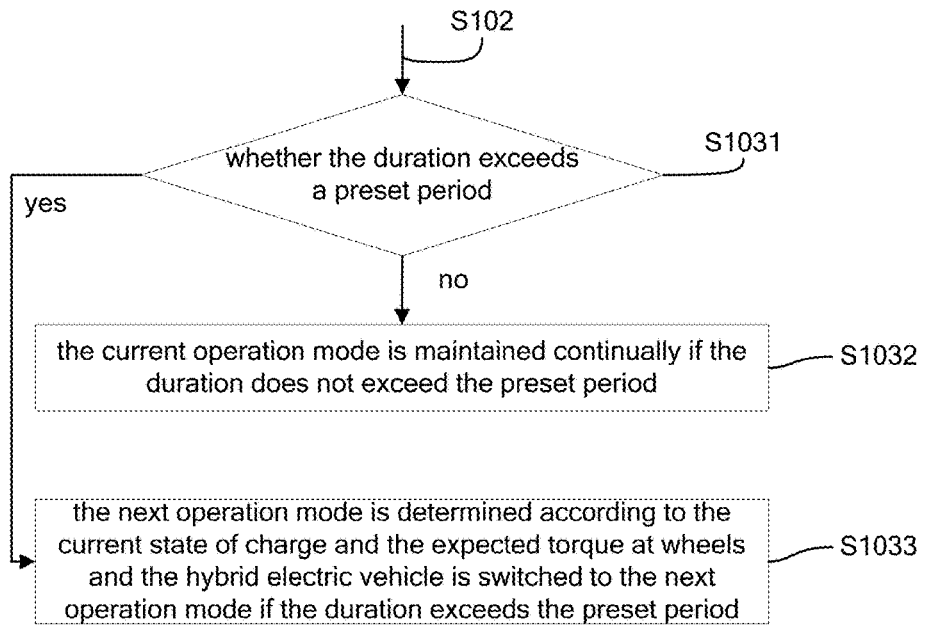
FIG. 2 is a flow chart of step S103 in FIG. 1 according to an embodiment of the present disclosure.

FIG. 2 is a flow chart of step S103 in FIG. 1 according to an embodiment of the present disclosure. In some embodiments of the present disclosure, as shown in FIG. 2, step S103 includes following steps.

In step S1031, it is judged whether the duration exceeds a preset period.

In step S1032, the current operation mode is maintained continually if the duration does not exceed the preset period.

In step S1033, the next operation mode is determined according to the current state of charge and the expected torque at wheels and the hybrid electric vehicle is switched to the next operation mode if the duration exceeds the preset period.

In some embodiments of the present disclosure, by setting the hysteresis areas, the frequent switching from one operation mode to another operation mode may be avoid.

Figure 3:
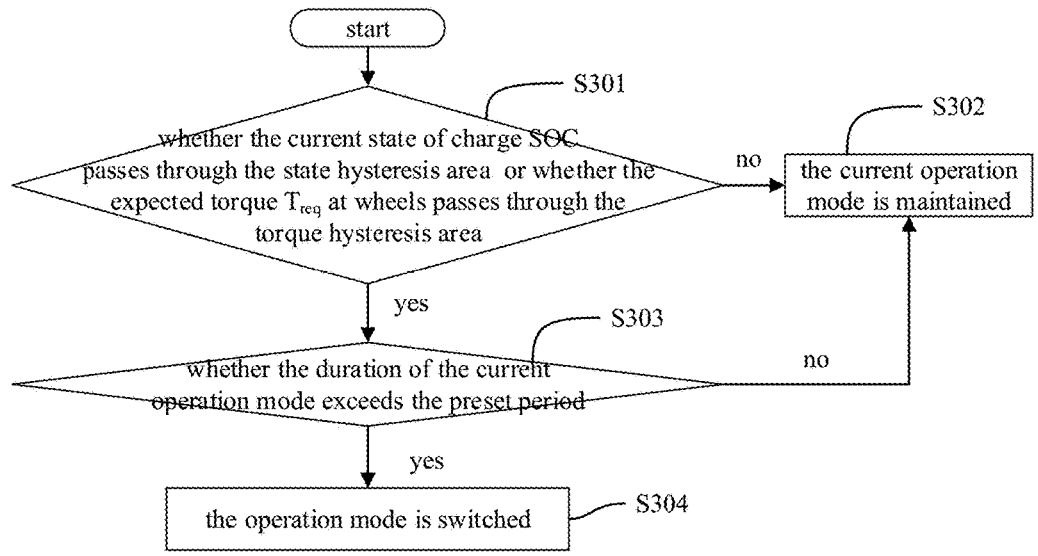
FIG. 3 is a flow chart of a method for controlling an operation mode of a hybrid electric vehicle according to another embodiment of the present disclosure.

In order to understand embodiments of the present disclosure better, the procedure of the method according to embodiments of the present disclosure will be described in detail with reference to FIG. 3. FIG. 3 is a flow chart of a method for controlling an operation mode of a hybrid electric vehicle according to another embodiment of the present disclosure. As shown in FIG. 3, the method for controlling an operation mode of a hybrid electric vehicle includes following steps.

In step S301, it is judged whether the state of charge passes through the state hysteresis area or whether the expected torque at wheels passes through the torque hysteresis area. If no, step S302 is executed, or if yes, step S303 is executed.

In step S302, the current operation mode is maintained, in other words, the current operation mode remains unchanged.

In step S303, it is further determined whether the duration of the current operation mode exceeds a preset period.

If no, step S302 is executed, or if yes, step S304 is executed.

In step S304, the operation mode is switched.

In some embodiments of the present disclosure, the method may be applied to a parallel hybrid electric vehicle, a four-wheel drive hybrid electric vehicle, or other hybrid electric vehicles. In some embodiments of the present disclosure, different hybrid electric vehicles correspond to different hysteresis areas and different operation modes (the following embodiments may be described respectively by taking the parallel hybrid electric vehicle as an example and taking the four-wheel drive hybrid electric vehicle as another example, and the hysteresis areas and the operation modes corresponding to other hybrid electric vehicles may be set by referring to the following embodiments).

In the following, processes using the method according to embodiments of the present disclosure in the parallel hybrid electric vehicle and the four-wheel drive hybrid electric will be described respectively.

Figure 4:
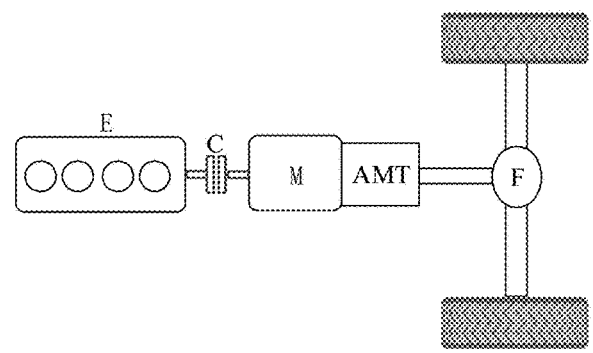
FIG. 4 is a schematic diagram illustrating a power assembly of a parallel hybrid electric vehicle according to an embodiment of the present disclosure.

As shown in FIG. 4, a power assembly of the parallel hybrid electric vehicle includes an engine E, an automatic clutch C, a motor M, an automatic mechanical transmission AMT and a main reducer F.

Figure 5:
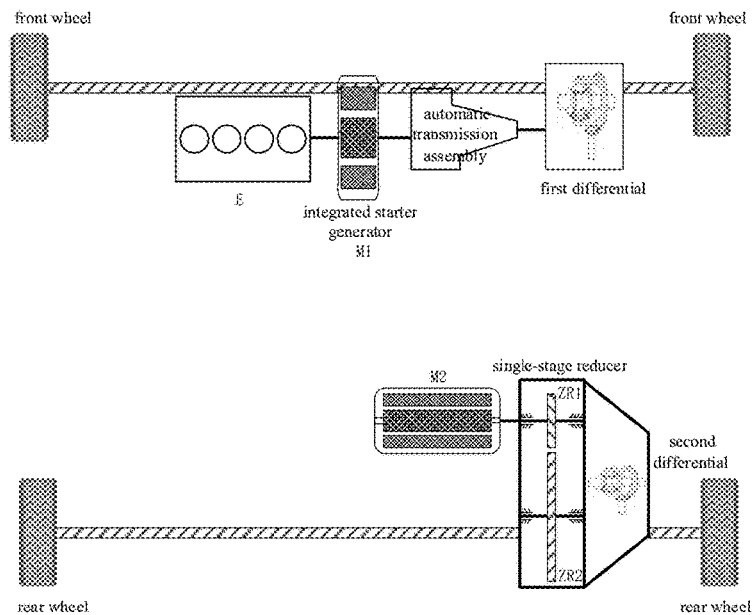
FIG. 5 is a schematic diagram illustrating a power assembly of a four-wheel drive hybrid electric vehicle according to an embodiment of the present disclosure.

As shown in FIG. 5, a front axle assembly of the four-wheel drive hybrid electric vehicle includes an engine E, an integrated starter generator M1, an automatic transmission assembly and a first differential; a rear axle assembly of the four-wheel drive hybrid electric vehicle includes a rear-wheel drive motor M2, a single-stage reducer and a second differential.

Parallel Hybrid Electric Vehicle

The operation modes of the parallel hybrid electric vehicle include a pure motor mode, a pure engine mode, a first mode with the motor driving and the engine operating at a fuel economy tending to an optimum fuel economy, a second mode with the motor driving and the engine operating at a maximum power, a third mode with the motor generating electricity and the engine operating at the fuel economy tending to the optimum fuel economy and a fourth mode with the engine operating at the maximum power.

In an embodiment of the present disclosure, determining the next operation mode according to the current state of charge and the expected torque at wheels includes:

determining the pure motor mode as the next operation mode if the current state of charge is greater than a first preset state of charge threshold and the expected torque at wheels is less than a first preset torque;

determining the pure engine mode as the next operation mode if the current state of charge is greater than the first preset state of charge threshold and the expected torque at wheels is greater than a second preset torque and less than a third preset torque;

determining the first mode with the motor driving and the engine operating at the fuel economy tending to the optimum fuel economy as the next operation mode if the current state of charge is greater than the first preset state of charge threshold and the expected torque at wheels is greater than a fourth preset torque and less than a fifth preset torque;

determining the second mode with the motor driving and the engine operating at the maximum power as the next operation mode if the current state of charge is greater than the first preset state of charge threshold and the expected torque at wheels is greater than a sixth preset torque;

determining the pure motor mode as the next operation mode if the current state of charge is greater than a third preset state of charge threshold and less than a second preset state of charge threshold and the expected torque at wheels is less than a seventh preset torque;

determining the third mode with the motor generating electricity and the engine operating at the fuel economy tending to the optimum fuel economy as the next operation mode if the current state of charge is greater than the third preset state of charge threshold and less than the second preset state of charge threshold and the expected torque at wheels is greater than an eighth preset torque and less than a ninth preset torque;

determining the pure engine mode as the next operation mode if the current state of charge is greater than the third preset state of charge threshold and less than the second preset state of charge threshold and the expected torque at wheels is greater than a tenth preset torque and less than an eleventh preset torque;

determining the second mode with the motor driving and the engine operating at the maximum power as the next operation mode if the current state of charge is greater than the third preset state of charge threshold and less than the second preset state of charge threshold and the expected torque at wheels is greater than a twelfth preset torque;

determining the third mode with the motor generating electricity and the engine operating at the fuel economy tending to the optimum fuel economy as the next operation mode if the current state of charge is less than a fourth preset state of charge threshold and the expected torque at wheels is less than a thirteenth preset torque;

determining the pure engine mode as the next operation mode if the current state of charge is less than the fourth preset state of charge threshold and the expected torque at wheels is greater than a fourteenth preset torque and less than a fifteenth preset torque;

determining the fourth mode with the engine operating at the maximum power as the next operation mode if the current state of charge is less than the fourth preset state of charge threshold and the expected torque at wheels is greater than a sixteenth preset torque.

Figure 6:
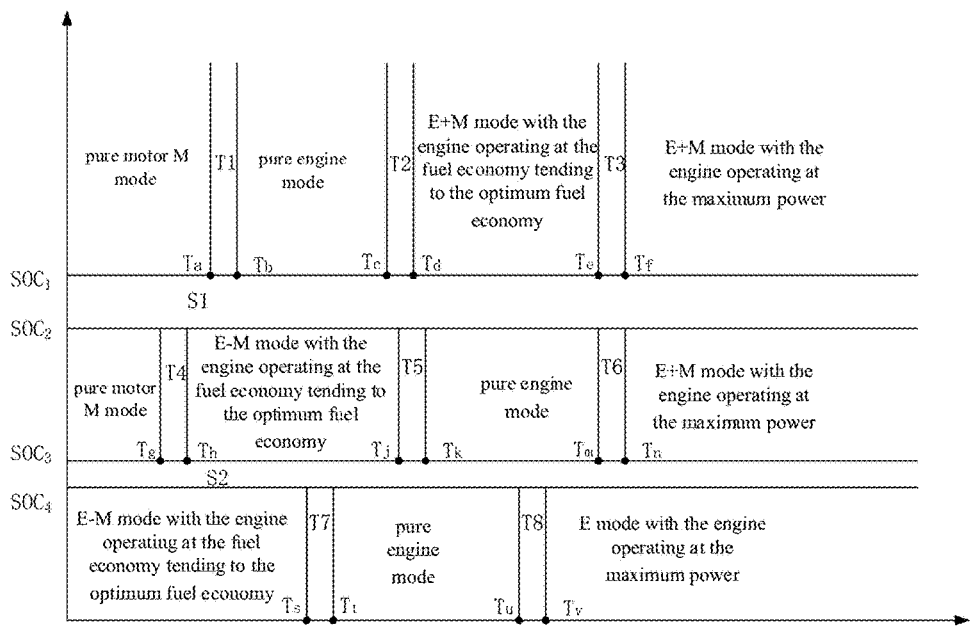
FIG. 6 is a schematic diagram illustrating a two-dimensional coordinate system with a state of charge of a power battery in a parallel hybrid electric vehicle as the y-coordinate and an expected torque at wheels of the parallel hybrid electric vehicle as the x-coordinate according to an embodiment of the present disclosure.

It should be noted that, in embodiments of the present disclosure, as shown in FIG. 6, it is a two-dimensional coordinate system with the state of charge SOC as the y-coordinate and the expected torque $T_{req}$ at wheels as the x-coordinate. In the two-dimensional coordinate system, a plurality of areas may be obtained by dividing the coordinate plane according to the first preset state of charge threshold $SOC_1$, the second preset state of charge threshold $SOC_2$, the third preset state of charge threshold $SOC_3$ and the fourth preset state of charge threshold $SOC_4$, the first preset torque $T_a$, the second preset torque $T_b$, the third preset torque $T_c$, the fourth preset torque $T_d$, the fifth preset torque $T_e$, the sixth preset torque $T_f$, the seventh preset torque $T_g$, the eighth preset torque $T_h$, the ninth preset torque $T_j$, the tenth preset torque $T_k$, the eleventh preset torque $T_m$, the twelfth preset torque $T_n$, the thirteenth preset torque $T_s$, the fourteenth preset torque $T_t$, the fifteenth preset torque $T_u$ and the sixteenth preset torque $T_v$.

For example, as shown in FIG. 6, if the current state of charge SOC is greater than the first preset state of charge threshold $SOC_1$ and the expected torque $T_{req}$ at wheels is less than the first preset torque $T_a$, it is determined that the parallel hybrid electric vehicle is under the pure motor mode (i.e. a mode with the motor driving); if the current state of charge SOC is greater than the first preset state of charge threshold $SOC_1$ and the expected torque $T_{req}$ at wheels is greater than the second preset torque $T_b$ and less than the third preset torque $T_c$, it is determined that the parallel hybrid electric vehicle is under the pure engine mode (i.e. a mode with the engine driving); if the current state of charge SOC is greater than the first preset state of charge threshold $SOC_1$ and the expected torque $T_{req}$ at wheels is greater than the fourth preset torque $T_d$ and less than the fifth preset torque $T_e$, it is determined that the parallel hybrid electric vehicle is under the first mode with the motor driving and the engine operating at the fuel economy tending to the optimum fuel economy (i.e. an E+M mode with the engine operating at the fuel economy tending to the optimum fuel economy, in which the vehicle is driven by the engine together with the motor and the engine operates under an economy mode); if the current state of charge SOC is greater than the first preset state of charge threshold $SOC_1$ and the expected torque $T_{req}$ at wheels is greater than the sixth preset torque $T_f$, it is determined that the parallel hybrid electric vehicle is under the second mode with the motor driving and the engine operating at the maximum power (i.e. an E+M mode with the engine operating at the maximum power, in which the vehicle is driven by the engine together with the motor and the engine operates under a maximum mode); if the current state of charge SOC is greater than the third preset state of charge threshold $SOC_3$ and less than the second preset state of charge threshold $SOC_2$ and the expected torque $T_{req}$ at wheels is less than the seventh preset torque $T_g$, it is determined that the parallel hybrid electric vehicle is under the pure motor mode (i.e. the mode with the motor driving); if the current state of charge SOC is greater than the third preset state of charge threshold $SOC_3$ and less than the second preset state of charge threshold $SOC_2$ and the expected torque $T_{req}$ at wheels is greater than the eighth preset torque $T_h$ and less than the ninth preset torque $T_j$, it is determined that the parallel hybrid electric vehicle is under the third mode with the motor generating electricity and the engine operating at the fuel economy tending to the optimum fuel economy (i.e. an E−M mode with the engine operating at the fuel economy tending to the optimum fuel economy, in which the vehicle is driven by the engine and the motor generates electricity, and the engine operates under the economy mode); if the current state of charge SOC is greater than the third preset state of charge threshold $SOC_3$ and less than the second preset state of charge threshold $SOC_2$ and the expected torque $T_{req}$ at wheels is greater than the tenth preset torque $T_k$ and less than the eleventh preset torque $T_m$, it is determined that the parallel hybrid electric vehicle is under the pure engine mode (i.e. the mode with the engine driving); if the current state of charge SOC is greater than the third preset state of charge threshold $SOC_3$ and less than the second preset state of charge threshold $SOC_2$ and the expected torque $T_{req}$ at wheels is greater than the twelfth preset torque $T_n$, it is determined that the parallel hybrid electric vehicle is under the second mode with the motor driving and the engine operating at the maximum power (i.e. the E+M mode with the engine operating at the maximum power); if the current state of charge SOC is less than the fourth preset state of charge threshold $SOC_4$ and the expected torque $T_{req}$ at wheels is less than the thirteenth preset torque $T_s$, it is determined that the parallel hybrid electric vehicle is under the third mode with the motor generating electricity and the engine operating at the fuel economy tending to the optimum fuel economy (i.e. the E−M mode with the engine operating at the fuel economy tending to the optimum fuel economy); if the current state of charge SOC is less than the fourth preset state of charge threshold $SOC_4$ and the expected torque $T_{req}$ at wheels is greater than the fourteenth preset torque $T_t$ and less than the fifteenth preset torque $T_u$, it is determined that the parallel hybrid electric vehicle is under the pure engine mode (i.e. the mode with the engine driving); if current state of charge SOC is less than the fourth preset state of charge threshold $SOC_4$ and the expected torque $T_{req}$ at wheels is greater than the sixteenth preset torque $T_v$, it is determined that the parallel hybrid electric vehicle is under the fourth mode with the engine operating at the maximum power (i.e. a mode with the engine operating under the maximum mode).

Details of the above described operation modes may be understood by referring to brief descriptions of the operation modes in the following table 1.

TABLE 1

| Nos. | preset mode conditions | operation modes | brief descriptions of operation modes |
|---|---|---|---|
| 1 | $SOC > SOC_1$ and $T_{req} < T_a$ | pure motor M mode | the vehicle is driven purely by the motor M |
| 2 | $SOC > SOC_1$ and $(T_b < T_{req} < T_c)$ | pure engine mode | the vehicle is driven purely by the engine E |
| 3 | $SOC > SOC_1$ and $(T_d < T_{req} < T_e)$ | E + M mode with the engine operating at the fuel economy tending to the optimum fuel economy | the engine E operates at the fuel economy tending to the optimum fuel economy, and other required power is provided by the motor M |
| 4 | $SOC > SOC_1$ and $T_f < T_{req}$ | E + M mode with the engine operating at the maximum power | the engine E operates along the engine external characteristic curve, and other required power is provided by the motor M |
| 5 | $(SOC_2 > SOC > SOC_3)$ and $T_{req} < T_g$ | pure motor M mode | the vehicle is driven purely by the motor M |
| 6 | $(SOC_2 > SOC > SOC_3)$ and $(T_h < T_{req} < T_j)$ | E − M mode with the engine operating at the fuel economy tending to the optimum fuel economy | the engine E operates at the fuel economy tending to the optimum fuel economy, and the redundant power is provided to the motor M for generating electricity |
| 7 | $(SOC_2 > SOC > SOC_3)$ and $(T_k < T_{req} < T_m)$ | pure engine mode | the vehicle is driven purely by the engine E |
| 8 | $(SOC_2 > SOC > SOC_3)$ and $T_n < T_{req}$ | E + M mode with the engine operating at the maximum power | the engine E operates along the engine external characteristic curve, and other required power is provided by the motor M |
| 9 | $SOC < SOC_4$ and $T_{req} < T_s$ | E − M mode with the engine operating at the fuel economy tending to the optimum fuel economy | the engine E operates at the fuel economy tending to the optimum fuel economy, and the redundant power is provided to the motor M for generating electricity |
| 10 | $SOC < SOC_4$ and $(T_t < T_{req} < T_u)$ | pure engine mode | the vehicle is driven purely by the engine E |
| 11 | $SOC < SOC_4$ and $T_v < T_{req}$ | E mode with the engine operating at the maximum power | the engine E operates along the engine external characteristic curve |

It should be noted that, as shown in FIG. 6, there are the state hysteresis area including a plurality of hysteresis areas of state and the torque hysteresis area including a plurality of hysteresis areas of torque in the coordinate plane with the state of charge SOC as the y-coordinate and the expected torque $T_{req}$ at wheels as the x-coordinate. An area in which the current state of charge SOC is greater than the second preset state of charge threshold $SOC_2$ and less than the first preset state of charge threshold $SOC_1$ is hysteresis area S1 of state; an area in which the current state of charge SOC is greater than the fourth preset state of charge threshold $SOC_4$ and less than the third preset state of charge threshold $SOC_3$ is hysteresis area S2 of state; an area in which the current state of charge SOC is greater than the first preset state of charge threshold $SOC_1$ and the expected torque $T_{req}$ at wheels is greater than the first preset torque $T_a$ and less than the second preset torque $T_b$ is hysteresis area T1 of torque; an area in which the current state of charge SOC is greater than the first preset state of charge threshold $SOC_1$ and the expected torque $T_{req}$ at wheels is greater than the third preset torque $T_c$ and less than the fourth preset torque $T_d$ is hysteresis area T2 of torque; an area in which the current state of charge SOC is greater than the first preset state of charge threshold $SOC_1$ and the expected torque $T_{req}$ at wheels is greater than the fifth preset torque $T_e$ and less than the sixth preset torque $T_f$ is hysteresis area T3 of torque; an area in which the current state of charge SOC is greater than the third preset state of charge threshold $SOC_3$ and less than the second preset state of charge threshold $SOC_2$ and the expected torque $T_{req}$ at wheels is greater than the seventh preset torque $T_g$ and less than the eighth preset torque $T_h$ is hysteresis area T4 of torque; an area in which the current state of charge SOC is greater than the third preset state of charge threshold $SOC_3$ and less than the second preset state of charge threshold $SOC_2$ and the expected torque $T_{req}$ at wheels is greater than the ninth preset torque $T_j$ and less than the tenth preset torque $T_k$ is hysteresis area T5 of torque; an area in which the current state of charge SOC is greater than the third preset state of charge threshold $SOC_3$ and less than the second preset state of charge threshold $SOC_2$ and the expected torque $T_{req}$ at wheels is greater than the eleventh preset torque $T_m$ and less than the twelfth preset torque $T_n$ is hysteresis area T6 of torque; an area in which the current state of charge SOC is less than the fourth preset state of charge threshold $SOC_4$ and the expected torque $T_{req}$ at wheels is greater than the thirteenth preset torque $T_s$ and less than the fourteenth preset torque $T_t$ is hysteresis area T7 of torque; an area in which the current state of charge SOC is less than the fourth preset state of charge threshold $SOC_4$ and the expected torque $T_{req}$ at wheels is greater than the fifteenth preset torque $T_u$ and less than the sixteenth preset torque $T_v$ is hysteresis area T8 of torque. The state hysteresis area and the torque hysteresis area may be termed dynamic areas.

Specifically, if it is detected that the current state of charge exits the above state hysteresis area and the expected torque at wheels exits the above torque hysteresis area, the duration of the current operation mode is obtained, and then the next operation mode is determined according to the duration, the current state of charge and the expected torque at wheels. More specifically, it is judged whether the duration of the current operation exceeds the preset period; if the duration exceeds the preset period, the next operation mode is determined according to the current state of charge and the expected torque at wheels; if the duration does not exceed the preset period, the current operation mode is maintained.

As shown in FIG. 3, it is judged whether the current state of charge SOC passes through the state hysteresis area or whether the expected torque $T_{req}$ at wheels passes through the torque hysteresis area (S301), in which the current state of charge SOC passing through the state hysteresis area refers to, for example, the current state of charge SOC changes to a range of $SOC_1<SOC$ from a range of $SOC<SOC_2$, and the expected torque $T_{req}$ at wheels passing through the torque hysteresis area refers to, for example, the expected torque $T_{req}$ at wheels changes to a range of $T_b<T_{req}$ from a range of $T_{req}<T_a$; if no, the current operation mode is maintained; if yes, it is further judged whether the duration of the current operation mode exceeds the preset period (S303), if no, the current operation mode is maintained (i.e. the operation mode remains unchanged) (S302); if yes, the operation mode is switched, i.e. the next operation mode is determined according to the current state of charge and the expected torque at wheels (S304). Therefore, the problems of frequently switching from an operation mode to another operation mode may be avoided.

For example, as shown in FIG. 6, assuming that the obtained expected torque $T_{req}$ at wheels is greater than the first preset torque $T_a$ and less than the second preset torque $T_b$, it may be determined that the expected torque $T_{req}$ at wheels is within the hysteresis area T1 of torque. Now, firstly, it is determined how the expected torque $T_{req}$ at wheels changes. Assuming that the expected torque $T_{req}$ at wheels changes from a range with values less than the first preset torque $T_a$ to a range with values greater than the second preset torque $T_b$, the current operation mode is determined as the pure motor M mode. Then, it is judged whether the duration of the current operation mode (i.e. the duration of the pure motor M mode) exceeds the preset period, if yes, it is determined that the next operation mode is the pure engine mode according to the expected torque $T_{req}$ at wheels, and then the operation mode is switched to the pure engine mode; if no, the current operation mode (i.e. the pure motor M mode) is maintained.

In some embodiments, the first preset state of charge threshold, the second preset state of charge threshold, the third preset state of charge threshold and the fourth preset state of charge threshold are respectively determined according to a capacity and a type of the power battery in the parallel hybrid electric vehicle. Specifically, the first preset state of charge threshold $SOC_1$ and the second preset state of charge threshold $SOC_2$ are target controlling thresholds of the state of charge SOC of the power battery. The specific values of the first preset state of charge threshold $SOC_1$ and the second preset state of charge threshold $SOC_2$ are set according to the type, the capacity and other parameters of the battery power. For example, if the power battery is a lithium battery, the first preset state of charge threshold $SOC_1$ and the second preset state of charge threshold $SOC_2$ are set respectively to 35% of the charge capacity of the power battery and 30% of the charge capacity of the power battery. The third preset state of charge threshold $SOC_3$ and the fourth preset state of charge threshold $SOC_4$ are minimum controlling thresholds of the state of charge SOC of the power battery. It should be understood that, if the state of charge of the power battery is less than the fourth preset state of charge threshold $SOC_4$, the battery is under charge seriously. Therefore, considering an estimation error of the state of charge SOC of the power battery, the minimum controlling threshold of the state of charge SOC of the power battery is set to 10% of the charge capacity of the power battery, for example, if the power battery is the lithium battery, the third preset state of charge threshold $SOC_3$ and the fourth preset state of charge threshold $SOC_4$ are set respectively to 12% of the charge capacity of the power battery and 10% of the charge capacity of the power battery.

In addition, in some embodiments, the first preset torque, the second preset torque, the third preset torque, the fourth preset torque, the fifth preset torque, the sixth preset torque, the seventh preset torque, the eighth preset torque, the ninth preset torque, the tenth preset torque, the eleventh preset torque, the twelfth preset torque, the thirteenth preset torque, the fourteenth preset torque, the fifteenth preset torque and the sixteenth preset torque are respectively determined by performing an actual vehicle calibration according to maximum torque characteristics of the motor, a wheel radius, a transmission efficiency, each gear ratio and a speed ratio of the main reducer.

It should be noted that, the change of the operation modes may improve the operating efficiency of the engine, and increase the power consumption. Under certain operation conditions, although the operating efficiency of the engine is improved significantly, the fuel economy of the vehicle is bad since the power consumption of the power battery and the motor is increased. Therefore, during the process of determining the operation mode, the improvement of the operating efficiency and the increase of power consumption should be considered comprehensively. The threshold values of the first to sixteenth preset torques in embodiments of the present disclosure are determined by performing the actual vehicle calibration. It should be understood that, after the threshold values change, the fuel economy of the vehicle will change thereupon, so the threshold values corresponding to the optimum fuel economy may be found by the calibration. In the following procedure, the processes of determining the threshold values of the first to sixteenth preset torques may be described in detail.

(1) Process of Determining the First Preset Torque $T_a$ and the Second Preset Torque $T_b$ The maximum torque characteristics of the motor M may represent the relationship between a peak torque and a rotary speed of the motor. According to a discharge power of a power system, a maximum torque characteristic curve under this discharge power may be determined, in which the available power of the power system refers to a value obtained by subtracting a power of the low-pressure and high-pressure accessory from a discharge power of the power battery or a generation power under the series mode. A corresponding relationship of torques obtained at wheels when the motor M operates according to the maximum torque characteristics of the motor M and speeds V at each gear may be calculated according to the maximum torque characteristics of the motor M, the wheel radius, the transmission efficiency, each gear ratio and the speed ratio of the main reducer, and then a biggest one is selected from the torques corresponding to each speed V as the maximum torque and an envelope smoothing is performed to obtain the relationship between the maximum torque M_max and the speed V. A torque array $[T_{mm0}, T_{mm1}, T_{mm2}, \ldots, T_{mmn}]$ corresponding to a speed array $[V_{m0}, V_{m1}, V_{m2}, \ldots, V_{mn}]$ may be calculated by an interpolation according to the relationship between M_max and V, in which $V_{m0}$ represents a minimum speed (the value of which is 0) at each gear when the motor M operates at a minimum stable rotary speed, $V_{mn}$ represents a maximum speed at each gear when the motor M operates at a maximum rotary speed. $[V_{m0}, V_{m1}, V_{m2}, \ldots, V_{mn}]$ and $[T_{mm0}, T_{mm1}, T_{mm2}, \ldots, T_{mmn},]$ form a one-dimensional interpolation table M_1. $T_b$ at each moment may be obtained by the interpolation according to the interpolation table M_1 after inputting a real-time speed, and $T_a$ is a multiple of $T_b$, typically the multiplying power is 95%, such that the frequent switching of the operation mode may be avoided. It should be noted that, in some embodiments of the present disclosure, when performing the actual vehicle calibration, all or some values in $[T_{mm0}, T_{mm1}, T_{mm2}, \ldots, T_{mmn}]$ are multiplied by a factor in a range of 0~1, the value of $T_b$ corresponding to the same speed may change and the change of $T_b$ may cause a change of mode switching thresholds.

(2) Process of Determining the Third Preset Torque $T_c$ and the Fourth Preset Torque $T_d$ The engine external characteristic $T_{em}$ curve represents a corresponding relationship between the torque and the rotary speed when the engine operates at the maximum torque. The optimum fuel economy $T_{eo}$ curve represents a corresponding relationship between the torque and the rotary speed when the engine operates at the optimum fuel economy. A corresponding relationship of torques obtained at wheels when the engine operates according to the engine external characteristic $T_{em}$ curve and speeds V at each gear is calculated according to the $T_{em}$ curve, the wheel radius, the transmission efficiency, each gear ratio and the speed ratio of the main reducer, and then a biggest one is selected from the torques corresponding to each speed V as a maximum torque and the envelope smoothing is performed to obtain the corresponding relationship between the maximum torque $T_{em\_w}$ and the speed V; in like manner, a corresponding relationship between an expected torque $T_{eo\_w}$ at wheels corresponding to the optimum fuel economy $T_{eo}$ curve and the speed V can be calculated. A speed array $[V_{e0}, V_{e1}, V_{e2}, \ldots, V_{en}]$ is given, in which $V_{e0}$ represents a minimum speed when the engine operates at the idle speed and $V_{en}$ represents a maximum speed when the engine operates at the maximum rotary speed. A torque array $[T_{em0}, T_{em1}, T_{em2}, \ldots, T_{emn}]$ corresponding to the speed array $[V_{e0}, V_{e1}, V_{e2}, \ldots, V_{en}]$ may be calculated by the interpolation according to the corresponding relationship between $T_{em\_w}$ and V, and $[V_{e0}, V_{e1}, V_{e2}, \ldots, V_{en}]$ and $[T_{em0}, T_{em1}, T_{em2}, \ldots, T_{emn}]$ form a one-dimensional interpolation table E_1; in like manner, a torque array $[T_{eo0}, T_{eo1}, T_{eo2}, \ldots, T_{eon}]$ corresponding to the speed array $[V_{e0}, V_{e1}, V_{e2}, \ldots, V_{en}]$ may be calculated by the interpolation according to the corresponding relationship between $T_{eo\_w}$ and V, and $[V_{e0}, V_{e1}, V_{e2}, \ldots, V_{en}]$ and $[T_{eo0}, T_{eo1}, T_{eo2}, \ldots, T_{eon}]$ form a one-dimensional interpolation table E_2.

The larger one of $V_{m0}$ and $V_{e0}$ is denoted as $V_{em0}$, the smaller one of $V_{mn}$ and $V_{en}$ is denoted as $V_{emn}$, and a speed array $[V_{em0}, V_{em1}, V_{em2}, \ldots, V_{emn}]$ is formed ranging from $V_{em0}$ to $V_{emn}$, in which three torque arrays $[T_{mme0}, T_{mme1}, T_{mme2}, \ldots, T_{mmen}]$, $[T_{emm0}, T_{emm1}, T_{emm2}, \ldots, T_{emmn}]$ and $[T_{eom0}, T_{eom1}, T_{eom2}, \ldots, T_{eomn}]$ are obtained after interpolating the speed array $[V_{em0}, V_{em1}, V_{em2}, \ldots, V_{emn}]$ according respectively to the interpolation table M_1, E_1 and E_2. A sum of $[T_{eom0}, T_{eom1}, T_{eom2}, \ldots, T_{eomn}]$ and $[T_{mme0}, T_{mme1}, T_{mme2}, \ldots, T_{mmen}]$ is denoted as $[T_{mmaeo0}, T_{mmaeo1}, T_{mmaeo2}, \ldots, T_{mmaeon}]$. By selecting the smaller one of each two corresponding elements respectively in $[T_{mmaeo0}, T_{mmaeo1}, T_{mmaeo2}, \ldots, T_{mmaeon}]$ and $[T_{emm0}, T_{emm1}, T_{emm2}, \ldots, T_{emmn}]$, an array $[T_{emamin0}, T_{emamin1}, T_{emamin2}, \ldots, T_{emaminn}]$ may be formed. The element in $[T_{emamin0}, T_{emamin1}, T_{emamin2}, \ldots, T_{emaminn}]$ is greater than or equal to the corresponding element in $[T_{eom0}, T_{eom1}, T_{eom2}, \ldots, T_{eonm}]$, and by selecting a value between the corresponding elements respectively in the above two arrays, for example, $T_{emb0}$ which is between $T_{eom0}$ and $T_{emamin0}$ is selected, $T_{embn}$ which is between $T_{eomn}$ and $T_{emaminn}$ is selected, an array $[T_{emb0}, T_{emb1}, T_{emb2}, \ldots, T_{embn}]$ may be formed. $[V_{em0}, V_{em1}, V_{em2}, \ldots, V_{emn}]$ and $[T_{emb0}, T_{emb1}, T_{emb2}, \ldots, T_{embn}]$ form a one-dimensional interpolation table EMb. The corresponding torque $T_d$ may be obtained by the interpolation according to the interpolation table EMb after inputting the real-time speed, and $T_e$ is a multiple of $T_d$, typically the multiplying power is 95%, such that the frequent switching of the operation mode may be avoided. It should be noted that, in some embodiments of the present disclosure, when performing the actual vehicle calibration, all or some values in $[T_{emb0}, T_{emb1}, T_{emb2}, \ldots, T_{embn}]$ are changed, the value of $T_d$ corresponding to the same speed may change and the change of $T_d$ may cause a change of mode switching thresholds.

(3) Process of Determining the Fifth Preset Torque $T_e$ and the Sixth Preset Torque $T_f$ A sum of $[T_{emm0}, T_{emm1}, T_{emm2}, \ldots, T_{emmn}]$ and $[T_{mme0}, T_{mme1}, T_{mme2}, \ldots, T_{mmen}]$ is denoted as $[T_{mmaem0}, T_{mmaem1}, T_{mmaem2}, \ldots, T_{mmaemn}]$, and $[V_{em0}, V_{em1}, V_{em2}, \ldots, V_{emn}]$ and $[T_{mmaem0}, T_{mmaem1}, T_{mmaem2}, \ldots, T_{mmaemn}]$ form a one-dimensional interpolation table EMa. The corresponding torque $T_f$ may be calculated by the interpolation according to the interpolation table EMa after inputting the real-time speed, and $T_e$ is a multiple of $T_f$, typically the multiplying power is 95%, such that the frequent switching of the operation mode may be avoided.

(4) Process of Determining the Seventh Preset Torque $T_g$ and the Eighth Preset Torque $T_h$ The process of determining $[T_{mm0}, T_{mm1}, T_{mm2}, \ldots, T_{mmn}]$ is the same as that in the process of determining the second preset torque $T_b$. During the actual vehicle calibration, all or some values in $[T_{mm0}, T_{mm1}, T_{mm2}, \ldots, T_{mmn}]$ are multiplied by a factor in a range of 0~1 to form an array $[T_{mmhev0}, T_{mmhev1}, T_{mmhev2}, \ldots, T_{mmhevn}]$. $[V_{m0}, V_{m1}, V_{m2}, \ldots, V_{mn}]$ and $[T_{mmhev0}, T_{mmhev1}, T_{mmhev2}, \ldots, T_{mmhevn}]$ form a one-dimensional interpolation table Mh_ev. $T_h$ at each moment may be obtained by the interpolation according to the interpolation table Mh_ev after inputting the real-time speed, and $T_g$ is a multiple of $T_h$, typically the multiplying power is 95%, such that the frequent switching of the operation mode may be avoided.

(5) Process of Determining the Ninth Preset Torque $T_j$ and the Tenth Preset Torque $T_k$ The maximum generating torque characteristics of the motor M may represent the relationship between the peak torque and the rotary speed of the motor when the motor is under a generation mode. According to a charging power of the power battery, a maximum torque characteristic curve under this charging power may be determined, and the charge power is related to the temperature and other factors. A corresponding relationship of torques obtained at wheels when the motor M operates according to the maximum generating torque characteristics and the speeds V at each gear may be calculated according to the maximum generating torque characteristics of the motor M, the wheel radius, the transmission efficiency, each gear ratio and the speed ratio of the main reducer, and then a biggest one of the torques corresponding to each speed is selected as a maximum torque and the envelope smoothing is performed to obtain the relationship between the maximum torque M1_max and the speed V. A torque array $[T_{mm10}, T_{mm11}, T_{mm12}, \ldots, T_{mm1n}]$ corresponding to a speed array $[V_{m10}, V_{m11}, V_{m12}, \ldots, V_{m1n}]$ may be calculated by the interpolation according to the relationship between M1_max and V, in which $V_{m10}$ represents a minimum speed (the value of which is 0) at each gear when the motor M operates at the minimum stable rotary speed, $V_{m1n}$ represents a maximum speed at each gear when the motor M operates at the maximum rotary speed. $[V_{m10}, V_{m11}, V_{m12}, \ldots, V_{m1n}]$ and $[T_{mm10}, T_{mm11}, T_{mm12}, \ldots, T_{mm1n}]$ form a one-dimensional interpolation table M1_1.

The engine minimum torque $T_{en}$ curve represents the corresponding relationship between the torque and the rotary speed when the engine operates at a minimum torque under the emission limit. If the torque is below this curve, the emission of the engine is poor, so the engine is prevented from operating in this area. A corresponding relationship of torques obtained at wheels when the engine operates according to the engine minimum torque $T_{en}$ curve and the speeds V at each gear may be calculated according to the $T_{en}$ curve, the wheel radius, the transmission efficiency, each gear ratio and the speed ratio of the main reducer, and then a smallest one of the torques corresponding to each speed V is selected and the envelope smoothing is performed to obtain the relationship between a minimum torque $T_{en\_w}$ and the speed V. A speed array $[V_{e0}, V_{e1}, V_{e2}, \ldots, V_{en}]$ is given, in which $V_{e0}$ represents a minimum speed when the engine operates at the idle speed and $V_{en}$ represents a maximum speed when the engine operates at the maximum rotary speed. A torque array $[T_{en0}, T_{en1}, T_{en2}, \ldots, T_{enn}]$ corresponding to the speed array $[V_{e0}, V_{e1}, V_{e2}, \ldots, V_{en}]$ may be calculated by the interpolation according to the corresponding relationship between $T_{en\_w}$ and V, and $[V_{e0}, V_{e1}, V_{e2}, \ldots, V_{en}]$ and $[T_{en0}, T_{en1}, T_{en2}, \ldots, T_{enn}]$ form a one-dimensional interpolation table E_3. The larger of $V_{m10}$ and $V_{e0}$ is denoted as $V_{em10}$, the smaller of $V_{m1n}$ and $V_{en}$ is denoted as $V_{em1n}$, and a speed array $[V_{em10}, V_{em11}, V_{em12}, \ldots, V_{em1n}]$ is formed ranging from $V_{em10}$ to $V_{em1n}$, in which three torque arrays $[T_{m1me0}, T_{m1me1}, T_{m1me2}, \ldots, T_{m1men}]$, $[T_{eom10}, T_{eom11}, T_{eom12}, \ldots, T_{eom1n}]$ and $[T_{enm10}, T_{enm11}, T_{enm12}, \ldots, T_{enm1n}]$ are obtained after interpolating the speed array $[V_{em10}, V_{em11}, V_{em12}, \ldots, V_{em1n}]$ according respectively to the interpolation table M1_1, E_2 and E_3. A difference of $[T_{eom10}, T_{eom11}, T_{eom12}, \ldots, T_{eom1n}]$ and $[T_{m1me0}, T_{m1me1}, T_{m1me2}, \ldots, T_{m1men}]$ is denoted as $[T_{eodm1m0}, T_{eodm1m1}, T_{eodm1m2}, \ldots, T_{eodm1mn}]$. By selecting the bigger of each two corresponding elements respectively in $[T_{eodm1m0}, T_{eodm1m1}, T_{eodm1m2}, \ldots, T_{eodm1mn}]$ and $[T_{enm10}, T_{enm11}, T_{enm12}, \ldots, T_{enm1n}]$, an array $[T_{emdmax0}, T_{emdmax1}, T_{emdmax2}, \ldots, T_{emdmaxn}]$ may be formed. The element in $[T_{enm10}, T_{enm11}, T_{enm12}, \ldots, T_{enm1n}]$ is less than or equal to the corresponding element in $[T_{emdmax0}, T_{emdmax1}, T_{emdmax2}, \ldots, T_{emdmaxn}]$, and by selecting a value between the corresponding elements respectively in the above two arrays, for example, $T_{emg0}$ which is between $T_{eom10}$ and $T_{emdmax0}$ is selected, $T_{emgn}$ which is between $T_{eom1n}$ and $T_{emdmax}$ is selected, an array $[T_{emg0}, T_{emg1}, T_{emg2}, \ldots, T_{emgn}]$ may be formed. $[V_{em10}, V_{em11}, V_{em12}, \ldots, V_{em1n}]$ and $[T_{emg0}, T_{emg1}, T_{emg2}, \ldots, T_{emgn}]$ form a one-dimensional interpolation table EM1g. The corresponding torque $T_k$ may be obtained by the interpolation according to the interpolation table EM1g after inputting the real-time speed, and $T_j$ is a multiple of $T_k$, typically the multiplying power is 95%, such that the frequent switching of the operation mode may be avoided. It should be noted that, in some embodiments of the present disclosure, when performing the actual vehicle calibration, all or some values in $[T_{emg0}, T_{emg1}, T_{emg2}, \ldots, T_{emgn}]$ are changed, the value of $T_k$ corresponding to the same speed may change and the change of $T_k$ may cause a change of mode switching thresholds.

(6) Process of Determining the Eleventh Preset Torque $T_m$ and the Twelfth Preset Torque $T_n$ The process of determining the eleventh preset torque $T_m$ and the twelfth preset torque $T_n$ is the same as that of determining the fifth preset torque $T_e$ and the sixth preset torque $T_f$.

(7) Process of Determining the Thirteenth Preset Torque $T_s$ and the Fourteenth Preset Torque $T_t$ The process of determining the thirteenth preset torque $T_s$ and the fourteenth preset torque $T_t$ is the same as that of determining the ninth preset torque $T_j$ and the tenth preset torque $T_k$.

(8) Process of Determining the Fifteenth Preset Torque $T_u$ and the Sixteenth Preset Torque $T_v$ The process of determining the fifteenth preset torque $T_u$ and the sixteenth preset torque $T_v$ is the same as that of determining the eleventh preset torque $T_m$ and the twelfth preset torque $T_n$.

The technical problem solved by the method for controlling an operation mode of a hybrid electric vehicle according to embodiments of the present disclosure is that, a correct operation mode of the parallel hybrid electric vehicle under the driving condition is determined according to structural characteristics of the parallel hybrid electric vehicle and by adopting four parameters, i.e. the state of charge, the expected torque at wheels, a state at the current time (i.e. the current operation mode) and the duration of the state (i.e. the duration of the current operation mode); methods for calibrating and debugging threshold values in each operation mode are determined, and the balance of increasing the power consumption and improving the operating efficiency of the engine may be found, so that the vehicle may be under the optimal mode in real-time and the fuel economy is improved while the frequent switching of the operation mode is avoided and the degree of comfort is improved.

The method for controlling an operation mode of a hybrid electric vehicle according to embodiments of the present disclosure has advantageous effects as follows. (1) The operation mode may be determined by adopting four controlling parameters, i.e. the current state of charge, the expected torque at wheels, the current operation mode and the duration of the current operation mode, in which the problems of frequently switching from one operation mode to another operation mode may be avoided by adopting two controlling parameters, i.e. the current operation mode and the duration of the current operation mode. (2) During a process of controlling the current state of charge, both general operating conditions and the vehicle starting process are taken into account. During the vehicle starting process, if the current state of charge is slightly lower than the target value, the pure motor operating conditions may be adopted and the vehicle has the good comprehensive performance at this moment; if the current state of charge is far lower than the target value, the pure motor operating conditions cannot be adopted to avoid the fault that the battery is under charge. (3) The conditions of switching from one operation mode to another operation mode can be calibrated easily, which is conducive to the actual vehicle calibration, and by performing the actual vehicle calibration a balance of increasing the power consumption and improving the operating efficiency may be found, thus improving the fuel economy of the vehicle. (4) The consideration is comprehensive, which ensures that the operation modes may be distributed properly in the coordinate plane of the state of charge and the expected torque and the conditions are easy to determine.

Four-Wheel Drive Hybrid Electric Vehicle

The operation modes of the four-wheel drive hybrid electric vehicle includes a pure rear-wheel drive motor mode, a pure engine mode, a fifth mode with the rear-wheel drive motor driving and the engine operating at a fuel economy tending to an optimum fuel economy, a sixth mode with the rear-wheel drive motor and the integrated starter generator driving and the engine operating at the fuel economy tending to the optimum fuel economy, a series mode, a seventh mode with the integrated starter generator generating electricity and the engine operating at the fuel economy tending to the optimum fuel economy, an eighth mode with the rear-wheel drive motor driving and the engine operating at a maximum power, a ninth mode with the rear-wheel drive motor and the integrated starter generator driving and the engine operating at the maximum power and a tenth mode with the engine operating at the maximum power.

In some embodiments of the present disclosure, determining the next operation mode according to the current state of charge and the expected torque at wheels includes:

determining the pure rear-wheel drive motor mode as the next operation mode if the current state of charge is greater than a fifth preset state of charge threshold and the expected torque at wheels is less than a twenty-first preset torque;

determining the pure engine mode as the next operation mode if the current state of charge is greater than the fifth preset state of charge threshold and the expected torque at wheels is greater than a twenty-second preset torque and less than a twenty-third preset torque;

determining the fifth mode with the rear-wheel drive motor driving and the engine operating at the fuel economy tending to the optimum fuel economy as the next operation mode if the current state of charge is greater than the fifth preset state of charge threshold and the expected torque at wheels is greater than a twenty-fourth preset torque and less than a twenty-fifth preset torque;

determining the sixth mode with the rear-wheel drive motor and the integrated starter generator driving and the engine operating at the fuel economy tending to the optimum fuel economy as the next operation mode if the current state of charge is greater than the fifth preset state of charge threshold and the expected torque at wheels is greater than a twenty-sixth preset torque;

determining the pure rear-wheel drive motor mode or the series mode as the next operation mode if the current state of charge is greater than a seventh preset state of charge threshold and less than a sixth preset state of charge threshold and the expected torque at wheels is less than a twenty-seventh preset torque;

determining the seventh mode with the integrated starter generator generating electricity and the engine operating at the fuel economy tending to the optimum fuel economy as the next operation mode if the current state of charge is greater than the seventh preset state of charge threshold and less than the sixth preset state of charge threshold and the expected torque at wheels is greater than a twenty-eighth preset torque and less than a twenty-ninth preset torque;

determining the pure engine mode as the next operation mode if the current state of charge is greater than the seventh preset state of charge threshold and less than the sixth preset state of charge threshold and the expected torque at wheels is greater than a thirtieth preset torque and less than a thirty-first preset torque;

determining the eighth mode with the rear-wheel drive motor driving and the engine operating at the maximum power as the next operation mode if the current state of charge is greater than the seventh preset state of charge threshold and less than the sixth preset state of charge threshold and the expected torque at wheels is greater than a thirty-second preset torque and less than a thirty-third preset torque;

determining the ninth mode with the rear-wheel drive motor and the integrated starter generator driving and the engine operating at the maximum power as the next operation mode if the current state of charge is greater than the seventh preset state of charge threshold and less than the sixth preset state of charge threshold and the expected torque at wheels is greater than a thirty-fourth preset torque;

determining the series mode as the next operation mode if the current state of charge is less than an eighth preset state of charge threshold and the expected torque at wheels is less than a thirty-fifth preset torque;

determining the seventh mode with the integrated starter generator generating electricity and the engine operating at the fuel economy tending to the optimum fuel economy as the next operation mode if the current state of charge is less than the eighth preset state of charge threshold and the expected torque at wheels is greater than a thirty-sixth preset torque and less than a thirty-seventh preset torque;

determining the pure engine mode as the next operation mode if the current state of charge is less than the eighth preset state of charge threshold and the expected torque at wheels is greater than a thirty-eighth preset torque and less than a thirty-ninth preset torque;

determining the tenth mode with the engine operating at the maximum power as the next operation mode if the current state of charge is less than the eighth preset state of charge threshold and the expected torque at wheels is greater than a fortieth preset torque.

Figure 7:
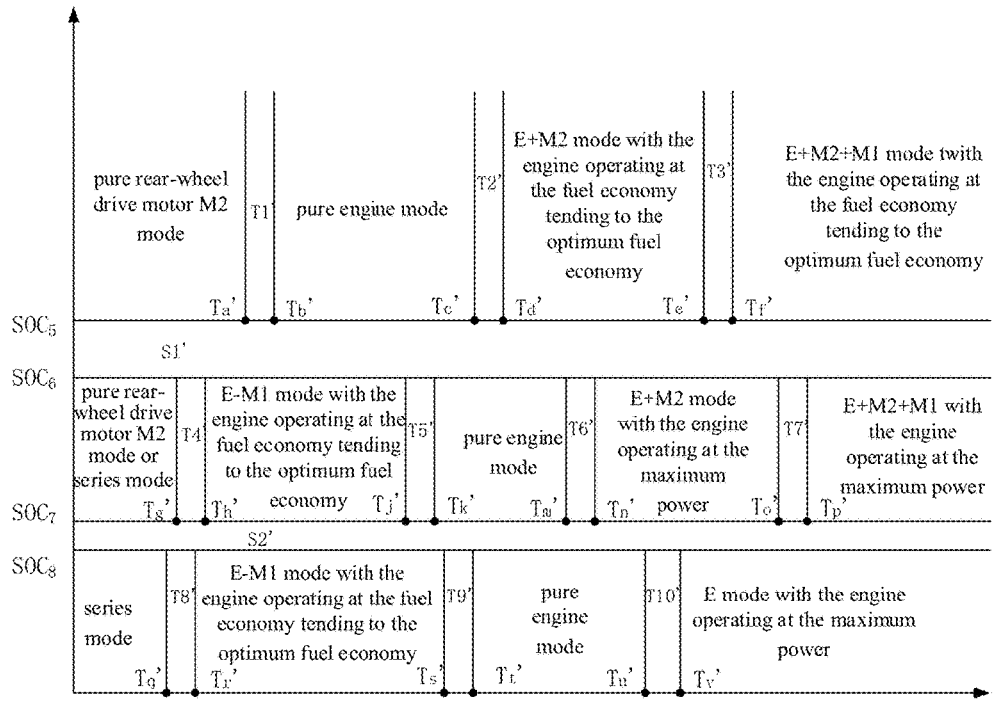
FIG. 7 is a schematic diagram illustrating a two-dimensional coordinate system with a state of charge of a power battery in a four-wheel drive hybrid electric vehicle as the y-coordinate and an expected torque at wheels of the four-wheel drive hybrid electric vehicle as the x-coordinate according to an embodiment of the present disclosure.

As shown in FIG. 7, if the current state of charge SOC is greater than the fifth preset state of charge threshold $SOC_5$ and the expected torque $T_{req}$ at wheels is less than the twenty-first preset torque $T_a'$, it is determined that the four-wheel hybrid electric vehicle is under the pure rear-wheel drive motor mode (i.e. a pure M2 mode, which is understood as a mode only with the rear-wheel drive motor driving); if the current state of charge SOC is greater than the fifth preset state of charge threshold $SOC_5$ and the expected torque $T_{req}$ at wheels is greater than the twenty-second preset torque $T_b'$ and less than the twenty-third preset torque $T_c'$, it is determined that the four-wheel hybrid electric vehicle is under the pure engine mode (i.e. a mode only with the engine driving); if the current state of charge SOC is greater than the fifth preset state of charge threshold $SOC_5$ and the expected torque $T_{req}$ at wheels is greater than the twenty-fourth preset torque $T_d'$ and less than the twenty-fifth preset torque $T_e'$, it is determined that the four-wheel hybrid electric vehicle is under the fifth mode with the rear-wheel drive motor driving and the engine operating at the fuel economy tending to the optimum fuel economy (i.e. an E+M2 mode with the engine operating at the fuel economy tending to the optimum fuel economy, in which the vehicle is driven by the engine together with the rear-wheel drive motor and the engine operates under an economy mode); if the current state of charge SOC is greater than the fifth preset state of charge threshold $SOC_5$ and the expected torque $T_{req}$ at wheels is greater than the twenty-sixth preset torque $T_f'$, it is determined that the four-wheel hybrid electric vehicle is under the sixth mode with the rear-wheel drive motor and the integrated starter generator driving and the engine operating at the fuel economy tending to the optimum fuel economy (i.e. an E+M2+M1 mode with the engine operating at the fuel economy tending to the optimum fuel economy, in which the vehicle is driven by the engine together with the integrated starter generator and the rear-wheel drive motor, and the engine operates under the economy mode); if the current state of charge SOC is greater than the seventh preset state of charge threshold $SOC_7$ and less than the sixth preset state of charge threshold $SOC_6$ and the expected torque $T_{req}$ at wheels is less than the twenty-seventh preset torque $T_g'$, it is determined that the four-wheel hybrid electric vehicle is under the pure rear-wheel drive motor mode (i.e. the pure M2 mode) or the series mode; if the current state of charge SOC is greater than the seventh preset state of charge threshold $SOC_7$ and less than the sixth preset state of charge threshold $SOC_6$ and the expected torque $T_{req}$ at wheels is greater than the twenty-eighth preset torque $T_h'$ and less than a twenty-ninth preset torque $T_j'$, it is determined that the four-wheel hybrid electric vehicle is under the seventh mode with the integrated starter generator generating electricity and the engine operating at the fuel economy tending to the optimum fuel economy (i.e. an E−M1 mode with the engine operating at the fuel economy tending to the optimum fuel economy, in which the vehicle is driven by the engine, the integrated starter generator generates electricity, and the engine operates under the economy mode); if the current state of charge SOC is greater than the seventh preset state of charge threshold $SOC_7$ and less than the sixth preset state of charge threshold $SOC_6$ and the expected torque $T_{req}$ at wheels is greater than the thirtieth preset torque $T_k'$ and less than the thirty-first preset torque $T_m'$, it is determined that the four-wheel hybrid electric vehicle is under the pure engine mode; if the current state of charge SOC is greater than the seventh preset state of charge threshold $SOC_7$ and less than the sixth preset state of charge threshold $SOC_6$ and the expected torque $T_{req}$ at wheels is greater than the thirty-second preset torque $T_n'$ and less than the thirty-third preset torque $T_o'$, it is determined that the four-wheel hybrid electric vehicle is under the eighth mode with the rear-wheel drive motor driving and the engine operating at the maximum power (i.e. an E+M2 mode with the engine operating at the maximum power, in which the vehicle is driven by the engine and the rear-wheel drive motor, and the engine operates under a maximum mode); if the current state of charge SOC is greater than the seventh preset state of charge threshold $SOC_7$ and less than the sixth preset state of charge threshold $SOC_6$ and the expected torque $T_{req}$ at wheels is greater than the thirty-fourth preset torque $T_p'$, it is determined that the four-wheel hybrid electric vehicle is under the ninth mode with the rear-wheel drive motor and the integrated starter generator driving and the engine operating at the maximum power (i.e. an E+M2+M1 mode with the engine operating at the maximum power, in which the vehicle is driven by the engine together with the rear-wheel drive motor and the integrated starter generator, and the engine operates under the maximum mode); if the current state of charge SOC is less than the eighth preset state of charge threshold $SOC_8$ and the expected torque $T_{req}$ at wheels is less than the thirty-fifth preset torque $T_q'$, it is determined that the four-wheel hybrid electric vehicle is under the series mode; if the current state of charge SOC is less than the eighth preset state of charge threshold $SOC_8$ and the expected torque $T_{req}$ at wheels is greater than the thirty-sixth preset torque $T_r'$ and less than the thirty-seventh preset torque $T_s'$, it is determined that the four-wheel hybrid electric vehicle is under the seventh mode with the integrated starter generator generating electricity and the engine operating at the fuel economy tending to the optimum fuel economy (i.e. the E−M1 with the engine operating at the fuel economy tending to the optimum fuel economy, in which the vehicle is driven by the engine, the integrated starter generator generates electricity, and the engine operates under the economy mode); if the current state of charge SOC is less than the eighth preset state of charge threshold $SOC_8$ and the expected torque $T_{req}$ at wheels is greater than the thirty-eighth preset torque $T_t'$ and less than the thirty-ninth preset torque $T_u'$, it is determined that the four-wheel hybrid electric vehicle is under the pure engine mode; if the current state of charge SOC is less than the eighth preset state of charge threshold $SOC_8$ and the expected torque $T_{req}$ at wheels is greater than the fortieth preset torque $T_v'$, it is determined that the four-wheel hybrid electric vehicle is under the tenth mode with the engine operating at the maximum power (i.e. a mode with the engine operating at the maximum power). Details of the above described operation modes may be understood by referring to brief descriptions of the operation modes in the following table 2.

TABLE 2

| Nos. | preset mode conditions | operation modes | brief descriptions of operation modes |
|---|---|---|---|
| 1 | $SOC > SOC_5$ and $T_{req} < T_a'$ | pure rear-wheel drive motor M2 mode | the vehicle is driven purely by motor M2 |
| 2 | $SOC > SOC_5$ and $(T_b' < T_{req} < T_c')$ | pure engine mode | the vehicle is driven purely by the engine |
| 3 | $SOC > SOC_5$ and $(T_d' < T_{req} < T_e')$ | E + M2 mode with the engine operating at the fuel economy tending to the optimum fuel economy | the engine operates at the fuel economy tending to the optimum fuel economy, and other required power is provided by motor M2 |
| 4 | $SOC > SOC_5$ and $T_f' < T_{req}$ | E + M2 + M1 mode with the engine operating at the fuel economy tending to the optimum fuel economy | the engine operates at the fuel economy tending to the optimum fuel economy, and other required power is provided by motors M2 and M1 |
| 5 | $(SOC_6 > SOC > SOC_7)$ and $T_{req} < T_g'$ | pure rear-wheel drive motor M2 mode or series mode | the vehicle is driven purely by motor M2 (the current state is stationary); or in series mode (the current state is non-stationary), the transmission is at neutral position, motor M1 generates electricity and motor M2 drives |
| 6 | $(SOC_6 > SOC > SOC_7)$ and $(T_h' < T_{req} < T_j')$ | E − M1 mode with the engine operating at the fuel economy tending to the optimum fuel economy | the engine operates at the fuel economy tending to the optimum fuel economy, and the redundant power is provided to motor M1 for generating electricity |
| 7 | $(SOC_6 > SOC > SOC_7)$ and $(T_k' < T_{req} < T_m')$ | pure engine mode | the vehicle is driven purely by the engine |

TABLE 2-continued

| Nos. | preset mode conditions | operation modes | brief descriptions of operation modes |
|---|---|---|---|
| 8 | ($SOC_6 > SOC > SOC_7$) and ($T_n' < T_{req} < T_o'$) | E + M2 mode with the engine operating at the maximum power | the engine operates along the engine external characteristic curve, and other required power is provided by motor M2 |
| 9 | ($SOC_6 > SOC > SOC_7$) and ($T_p' < T_{req}$) | E + M2 + M1 mode with the engine operating at the maximum power | the engine operates along the engine external characteristic curve, and other required power is provided by motors M2 and M1 |
| 10 | $SOC < SOC_8$ and $T_{req} < T_q'$ | series mode | the transmission is at neutral position, motor M1 generates electricity and motor M2 drives |
| 11 | $SOC < SOC_8$ and ($T_r' < T_{req} < T_s'$) | E – M1 mode with the engine operating at the fuel economy tending to the optimum fuel economy | the engine operates at the fuel economy tending to the optimum fuel economy, and the redundant power is provided to motor M1 for generating electricity |
| 12 | $SOC < SOC_8$ and ($T_t' < T_{req} < T_u'$) | pure engine mode | the vehicle is driven purely by the engine |
| 13 | $SOC < SOC_8$ and $T_v' < T_{req}$ | mode with the engine operating at the maximum power | the engine operates along the engine external characteristic curve |

It should be noted that, as shown in FIG. 7, there are the state hysteresis area including a plurality of hysteresis areas of state and the torque hysteresis area including a plurality of hysteresis areas of torque in the coordinate plane with the state of charge SOC as the y-coordinate and the expected torque $T_{req}$ at wheels as the x-coordinate. An area in which the current state of charge SOC is greater than the sixth preset state of charge threshold $SOC_6$ and less than the fifth preset state of charge threshold $SOC_5$ is hysteresis area S1' of state; an area in which the current state of charge SOC is greater than the eighth preset state of charge threshold $SOC_8$ and less than the seventh preset state of charge threshold $SOC_7$ is hysteresis area S2' of state; an area in which the current state of charge SOC is greater than the fifth preset state of charge threshold $SOC_5$ and the expected torque $T_{req}$ at wheels is greater than the twenty-first preset torque $T_a'$ and less than the twenty-second preset torque $T_b'$ is hysteresis area T1' of torque; an area in which the current state of charge SOC is greater than the fifth preset state of charge threshold $SOC_5$ and the expected torque $T_{req}$ at wheels is greater than the twenty-third preset torque $T_c'$ and less than the twenty-fourth preset torque $T_d'$ is hysteresis area T2' of torque; an area in which the current state of charge SOC is greater than the fifth preset state of charge threshold $SOC_5$ and the expected torque $T_{req}$ at wheels is greater than the twenty-fifth preset torque $T_e'$ and less than the twenty-sixth preset torque $T_f'$ is hysteresis area T3' of torque; an area in which the current state of charge SOC is greater than the seventh preset state of charge threshold $SOC_7$ and less than the sixth preset state of charge threshold $SOC_6$ and the expected torque $T_{req}$ at wheels is greater than the twenty-seventh preset torque $T_g'$ and less than the twenty-eighth preset torque $T_h'$ is hysteresis area T4' of torque; an area in which the current state of charge SOC is greater than the seventh preset state of charge threshold $SOC_7$ and less than the sixth preset state of charge threshold $SOC_6$ and the expected torque $T_{req}$ at wheels is greater than the twenty-ninth preset torque $T_j'$ and less than the thirtieth preset torque $T_k'$ is hysteresis area T5' of torque; an area in which the current state of charge SOC is greater than the seventh preset state of charge threshold $SOC_7$ and less than the sixth preset state of charge threshold $SOC_6$ and the expected torque $T_{req}$ at wheels is greater than the thirty-first preset torque $T_m'$ and less than the thirty-second preset torque $T_n'$ is hysteresis area T6' of torque; an area in which the current state of charge SOC is greater than the seventh preset state of charge threshold $SOC_7$ and less than the sixth preset state of charge threshold $SOC_6$ and the expected torque $T_{req}$ at wheels is greater than the thirty-third preset torque $T_o'$ and less than the thirty-fourth preset torque $T_p'$ is hysteresis area T7' of torque; an area in which the current state of charge SOC is less than the eighth preset state of charge threshold $SOC_8$ and the expected torque $T_{req}$ at wheels is greater than the thirty-fifth preset torque $T_q'$ and less than the thirty-sixth preset torque $T_r'$ is hysteresis area T8' of torque; an area in which the current state of charge SOC is less than the eighth preset state of charge threshold $SOC_8$ and the expected torque $T_{req}$ at wheels is greater than the thirty-seventh preset torque $T_s'$ and less than the thirty-eighth preset torque $T_t'$ is hysteresis area T9' of torque; an area in which the current state of charge SOC is less than the eighth preset state of charge threshold $SOC_8$ and the expected torque $T_{req}$ at wheels is greater than the thirty-ninth preset torque $T_u'$ and less than the fortieth preset torque $T_v'$ is hysteresis area T10' of torque. The state hysteresis area and the torque hysteresis area may be termed dynamic areas.

Specifically, if it is detected that the current state of charge exits the above state hysteresis area and the expected torque at wheels exits the above torque hysteresis area, the duration of the current operation mode is obtained, and then the next operation mode is determined according to the duration, the current state of charge and the expected torque at wheels. More specifically, it is judged whether the duration of the current operation mode exceeds the preset period; if the duration exceeds the preset period, the next operation mode is determined according to the current state of charge and the expected torque at wheels; if the duration does not exceed the preset period, the current operation mode is maintained.

As shown in FIG. 3, it is judged whether the current state of charge SOC passes through the state hysteresis area or whether the expected torque $T_{req}$ at wheels passes through the torque hysteresis area (S301), in which the current state of charge SOC passing through the state hysteresis area refers to, for example, the current state of charge SOC changes to a range of $SOC_5 < SOC$ from a range of $SOC < SOC_6$, and the expected torque $T_{req}$ at wheels passing through the torque hysteresis area refers to, for example, the expected torque $T_{req}$ at wheels changes to a range of $T_b' < T_{req}$ from a range of $T_{req} < T_a'$; if no, the current operation mode is maintained; if yes, it is further judged whether the duration of the current operation mode exceeds the preset period (S303), if no, the current operation mode is maintained (i.e. the operation mode remains unchanged) (S302); if yes, the operation mode is switched, i.e. the next operation mode is determined according to the current state of charge and the expected torque at wheels (S304). Therefore, the problems of frequently switching from an operation mode to another operation mode may be avoided.

For example, as shown in FIG. 7, assuming that the obtained expected torque $T_{req}$ at wheels is greater than the twenty-first preset torque $T_a'$ and less than the twenty-second preset torque $T_b'$, it may be determined that the expected torque $T_{req}$ at wheels is within the hysteresis area T1' of torque. Now, firstly, it is determined how the expected torque $T_{req}$ at wheels changes. Assuming that the expected torque $T_{req}$ at wheels changes from a range with values less than the twenty-first preset torque $T_a'$ to a range with values greater than the twenty-second preset torque $T_b'$, the current operation mode is determined as the pure rear-wheel drive motor M2 mode. Then, it is judged whether the duration of the current operation mode (i.e. the duration of the pure rear-wheel drive motor M2 mode) exceeds the preset period, if yes, it is determined that the next operation mode is the pure engine mode according to the expected torque $T_{req}$ at wheels, and then the operation mode is switched to the pure engine mode; if no, the current operation mode (i.e. the pure rear-wheel drive motor M2 mode) is maintained.

In some embodiments of the present disclosure, the fifth preset state of charge threshold, the sixth preset state of charge threshold, the seventh preset state of charge threshold and the eighth preset state of charge threshold are respectively determined according to a capacity and a type of the power battery in the four-wheel drive hybrid electric vehicle. Specifically, the fifth preset state of charge threshold $SOC_5$ and the sixth preset state of charge threshold $SOC_6$ are target controlling thresholds of the state of charge SOC of the power battery. The specific values of the fifth preset state of charge threshold $SOC_5$ and the sixth preset state of charge threshold $SOC_6$ are set according to the type, the capacity and other parameters of the battery power, for example, if the power battery is a lithium battery, the fifth preset state of charge threshold $SOC_5$ and the sixth preset state of charge threshold $SOC_6$ are set respectively to 35% of the charge capacity of the power battery and 30% of the charge capacity of the power battery. The seventh preset state of charge threshold $SOC_7$ and the eighth preset state of charge threshold $SOC_8$ are minimum controlling thresholds of the state of charge SOC of the power battery. It should be understood that, if the state of charge of the power battery is less than the eighth preset state of charge threshold $SOC_8$, the battery is under charge seriously. Therefore, considering an estimation error of the state of charge SOC of the power battery, the minimum controlling threshold of the state of charge SOC of the power battery is set to 10% of the charge capacity of the power battery, for example, if the power battery is the lithium battery, the seventh preset state of charge threshold $SOC_7$ and the eighth preset state of charge threshold $SOC_8$ are set respectively to 12% of the charge capacity of the power battery and 10% of the charge capacity of the power battery.

In addition, in some embodiments of the present disclosure, the twenty-first preset torque, the twenty-second preset torque, the twenty-third preset torque, the twenty-fourth preset torque, the twenty-fifth preset torque, the twenty-sixth preset torque, the twenty-seventh preset torque, the twenty-eighth preset torque, the twenty-ninth preset torque, the thirtieth preset torque, the thirty-first preset torque, the thirty-second preset torque, the thirty-third preset torque, the thirty-fourth preset torque, the thirty-fifth preset torque, the thirty-sixth preset torque, the thirty-seventh preset torque, the thirty-eighth preset torque, the thirty-ninth preset torque and the fortieth preset torque are respectively determined by performing an actual vehicle calibration according to maximum torque characteristics of the rear-wheel drive motor, a wheel radius, a transmission efficiency, each gear ratio and a speed ratio of a main reducer.

It should be noted that, the change of the operation modes may improve the operating efficiency of the engine, and increase the power consumption. Under certain operation conditions, although the operating efficiency of the engine is improved significantly, the fuel economy of the vehicle is bad since the power consumption of the power battery and the motor is increased. Therefore, during the process of determining the operation mode, the improvement of the operating efficiency and the increase of power consumption should be considered comprehensively. The threshold values of the twenty-first to fortieth preset torques in embodiments of the present disclosure are determined by performing the actual vehicle calibration. It should be understood that, after the threshold values change, the fuel economy of the vehicle will change thereupon, so the threshold values corresponding to the optimum fuel economy may be found by the calibration. In the following procedure, the processes of determining the threshold values of the twenty-first to fortieth preset torques may be described in detail.

(1) Process of Determining the Twenty-First Preset Torque $T_a'$ and the Twenty-Second Preset Torque $T_b'$ The maximum torque characteristics of the motor M2 may represent the relationship between a peak torque and a rotary speed of the motor. According to a discharge power of a power system, a maximum torque characteristic curve under this discharge power may be determined, in which the available power of the power system refers to a value obtained by subtracting a power of the low-pressure and high-pressure accessory from a discharge power of the power battery or a generation power under the series mode. A corresponding relationship between a maximum torque M2_max obtained at wheels when the motor M2 operates according to the maximum torque characteristics of the motor M2 and a speed V may be calculated according to the maximum torque characteristics of the motor M2, the wheel radius, the transmission efficiency, a speed ratio of the single-stage reducer and the speed ratio of the main reducer. A torque array $[T_{mm0}, T_{mm1}, T_{mm2}, \ldots, T_{mmn}]$ corresponding to a speed array $[V_{m0}, V_{m1}, V_{m2}, \ldots, V_{mn}]$ may be calculated by an interpolation according to the relationship between M2_max and V, in which $V_{m0}$ represents a minimum speed (the value of which is 0) when the motor M2 operates at a minimum stable rotary speed, $V_{mn}$ represents a maximum speed when the motor M2 operates at a maximum rotary speed. $[V_{m0}, V_{m1}, V_{m2}, \ldots, V_{mn}]$ and $[T_{mm0}, T_{mm1}, T_{mm2}, \ldots, T_{mmn}]$ form a one-dimensional interpolation table M2_1. $T_b'$ at each moment may be obtained by the interpolation according to the interpolation table M2_1 after inputting a real-time speed, and $T_a'$ is a multiple of $T_b'$, typically the multiplying power is 95%, such that the frequent switching of the operation mode may be avoided. It should be noted that, in some embodiments of the present disclosure, when performing the actual vehicle calibration, all or some values in $[T_{mm0}, T_{mm1}, T_{mm2}, \ldots, T_{mmn}]$ are multiplied by a factor in a range of 0~1, the value of $T_b'$ corresponding to the same speed may change and the change of $T_b'$ may cause a change of mode switching thresholds.

(2) Process of Determining the Twenty-Third Preset Torque $T_c'$ and the Twenty-Fourth Preset Torque $T_d'$ The engine external characteristic $T_{em}$ curve represents a corresponding relationship between the torque and the rotary speed when the engine operates at the maximum torque. The optimum fuel economy $T_{eo}$ curve represents a corresponding relationship between the torque and the rotary speed when the engine operates at the optimum fuel economy. A corresponding relationship of torques obtained at wheels when the engine operates according to the engine external characteristic $T_{em}$ curve and speeds V at each gear is calculated according to the $T_{em}$ curve, the wheel radius, the transmission efficiency, each gear ratio and the speed ratio of the main reducer, and then a biggest one is selected from the torques corresponding to each speed as a maximum torque and the envelope smoothing is performed to obtain the corresponding relationship between the maximum torque $T_{em\_w}$ and the speed V; in like manner, a corresponding relationship between a torque curve $T_{eo\_w}$ at wheels corresponding to the optimum fuel economy $T_{eo}$ and the speed V can be calculated. A speed array $[V_{e0}, V_{e1}, V_{e2}, \ldots, V_{en}]$ is given, in which $V_{e0}$ represents a minimum speed when the engine operates at the idle speed and $V_{en}$ represents a maximum speed when the engine operates at the maximum rotary speed. A torque array $[T_{em0}, T_{em1}, T_{em2}, \ldots, T_{emn}]$ corresponding to a speed array $[V_{e0}, V_{e1}, V_{e2}, \ldots, V_{en}]$ may be calculated by the interpolation according to the corresponding relationship between $T_{em\_w}$ and V, and $[V_{e0}, V_{e1}, V_{e2}, \ldots, V_{en}]$ and $[T_{em0}, T_{em1}, T_{em2}, \ldots, T_{emn}]$ form a one-dimensional interpolation table E_1; in like manner, a torque array $[T_{eo0}, T_{eo1}, T_{eo2}, \ldots, T_{eon}]$ corresponding to the speed array $[V_{e0}, V_{e1}, V_{e2}, \ldots, V_{en}]$ may be calculated by the interpolation according to the corresponding relationship between $T_{eo\_w}$ and V, and $[V_{e0}, V_{e1}, V_{e2}, \ldots, V_{en}]$ and $[T_{eo0}, T_{eo1}, T_{eo2}, \ldots, T_{eon}]$ form a one-dimensional interpolation table E_2.

The larger one of $V_{m0}$ and $V_{e0}$ is denoted as $V_{em0}$, the smaller one of $V_{mn}$ and $V_{en}$ is denoted as $V_{emn}$, and a speed array $[V_{em0}, V_{em1}, V_{em2}, \ldots, V_{emn}]$ is formed ranging from $V_{em0}$ to $V_{emn}$, in which three torque arrays $[T_{mme0}, T_{mme1}, T_{mme2}, \ldots, T_{mmen}]$, $[T_{emm0}, T_{emm1}, T_{emm2}, \ldots, T_{emmn}]$ and $[T_{eom0}, T_{eom1}, T_{eom2}, \ldots, T_{eomn}]$ are obtained after interpolating the speed array $[V_{em0}, V_{em1}, V_{em2}, \ldots, V_{emn}]$ according respectively to the interpolation table M2_1, E_1 and E_2. A sum of $[T_{eom0}, T_{eom1}, T_{eom2}, \ldots, T_{eomn}]$ and $[T_{mme0}, T_{mme1}, T_{mme2}, \ldots, T_{mmen}]$ is denoted as $[T_{mmaeo0}, T_{mmaeo1}, T_{mmaeo2}, \ldots, T_{mmaeon}]$. By selecting the smaller one of each two corresponding elements respectively in $[T_{mmaeo0}, T_{mmaeo1}, T_{mmaeo2}, \ldots, T_{mmaeon}]$ and $[T_{emm0}, T_{emm1}, T_{emm2}, \ldots, T_{emmn}]$, an array $[T_{emamin0}, T_{emamin1}, T_{emamin2}, \ldots, T_{emaminn}]$ may be formed. The element in $[T_{emamin0}, T_{emamin1}, T_{emamin2}, \ldots, T_{emaminn}]$ is greater than or equal to the corresponding element in $[T_{eom0}, T_{eom1}, T_{eom2}, \ldots, T_{eonm}]$, and by selecting a value between the corresponding elements respectively in the above two arrays, for example, $T_{emb0}$ which is between $T_{eom0}$ and $T_{emamin0}$ is selected, $T_{embn}$ which is between $T_{eomn}$ and $T_{emaminn}$ is selected, an array $[T_{emb0}, T_{emb1}, T_{emb2}, \ldots, T_{embn}]$ may be formed. $[V_{em0}, V_{em1}, V_{em2}, \ldots, V_{emn}]$ and $[T_{emb0}, T_{emb1}, T_{emb2}, \ldots, T_{embn}]$ form a one-dimensional interpolation table EM2b. The corresponding torque $T_d'$ may be obtained by the interpolation according to the interpolation table EM2b after inputting the real-time speed, and $T_c'$ is a multiple of $T_d'$, typically the multiplying power is 95%, such that the frequent switching of the operation mode may be avoided. It should be noted that, in some embodiments of the present disclosure, when performing the actual vehicle calibration, all or some values in $[T_{emb0}, T_{emb1}, T_{emb2}, \ldots, T_{embn}]$ are changed, the value of $T_d'$ corresponding to the same speed may change and the change of $T_d'$ may cause a change of mode switching thresholds.

(3) Process of Determining the Twenty-Fifth Preset Torque $T_e'$ and the Twenty-Sixth Preset Torque $T_f'$ $[V_{em0}, V_{em1}, V_{em2}, \ldots, V_{emn}]$ and $[T_{mmaeo0}, T_{mmaeo1}, T_{mmaeo2}, \ldots, T_{mmaeon}]$ form a one-dimensional interpolation table EM2a. The corresponding torque $T_f'$ may be calculated by the interpolation according to the interpolation table EM2a after inputting the real-time speed, and $T_e'$ is a multiple of $T_f'$, typically the multiplying power is 95%, such that the frequent switching of the operation mode may be avoided.

(4) Process of Determining the Twenty-Seventh Preset Torque $T_g'$ and the Twenty-Eighth Preset Torque $T_h'$ There are two possible operation modes: the pure motor mode and the series mode, in which when the vehicle is stationary at the current time, the vehicle enters the pure motor condition when starting; otherwise the vehicle enters the series mode.

In the pure motor mode, the process of determining $[T_{mm0}, T_{mm1}, T_{mm2}, \ldots, T_{mmn}]$ is the same as that in the process of determining the twenty-second preset torque $T_b'$. During the actual vehicle calibration, all or some values in $[T_{mm0}, T_{mm1}, T_{mm2}, \ldots, T_{mmn}]$ are multiplied by a factor in a range of 0~1 to form an array $[T_{mmhev0}, T_{mmhev1}, T_{mmhev2}, \ldots, T_{mmhevn}]$. $[V_{m0}, V_{m1}, V_{m2}, \ldots, V_{mn}]$ and $[T_{mmhev0}, T_{mmhev1}, T_{mmhev2}, \ldots, T_{mmhevn}]$ form a one-dimensional interpolation table M2h_ev.

In the series mode, a power corresponding to the optimum fuel economy of the engine may be determined according to parameters of the motor and the engine, and the smaller one of this power and a peak power of the motor M1 is selected and multiplied by generating efficiency of the motor M1 and charging efficiency of the power battery to obtain a value, and then this value minus the power of the low-pressure and high-pressure accessory is the discharging power of the power system. An array $[T_{mm0}, T_{mm1}, T_{mm2}, \ldots, T_{mmn}]$ at this moment may be determined according to the process of determining $[T_{mm0}, T_{mm1}, T_{mm2}, \ldots, T_{mmn}]$ at the twenty-second preset torque $T_b'$. During the actual vehicle calibration, all or some values in $[T_{mm0}, T_{mm1}, T_{mm2}, \ldots, T_{mmn}]$ are multiplied by a factor in a range of 0~1 to form an array $[T_{mmhs0}, T_{mmhs1}, T_{mmhs2}, \ldots, T_{mmhsn}]$. $[V_{m0}, V_{m1}, V_{m2}, \ldots, V_{mn}]$ and $[T_{mmhs0}, T_{mmhs1}, T_{mmhs2}, \ldots, T_{mmhsn}]$ form a one-dimensional interpolation table M2h_sh.

$T_h'$ at each moment may be obtained by the interpolation according to the interpolation table M2h_ev or M2h_sh after inputting the real-time speed, and $T_g'$ is a multiple of $T_h'$, typically the multiplying power is 95%, such that the frequent switching of the operation mode may be avoided.

(5) Process of Determining the Twenty-Ninth Preset Torque $T_j'$ and the Thirtieth Preset Torque $T_k'$ The maximum generating torque characteristics of the motor M1 may represent the relationship between the peak torque and the rotary speed of the motor when the motor is under a generation mode. According to a charging power of the power battery, a maximum torque characteristic curve under this charging power may be determined, and the charging power is related to the temperature and other factors. A corresponding relationship of torques obtained at wheels when the motor M1 operates according to the maximum generating torque characteristics and the speeds V at each gear is calculated according to the maximum generating torque characteristics of the motor M1, the wheel radius, the transmission efficiency, each gear ratio and the speed ratio of the main reducer, and then a biggest one of the torques corresponding to each speed is selected as the maximum torque and the envelope smoothing is performed to obtain the relationship between the maximum torque M1_max and the speed V. A torque array $[T_{mm10}, T_{mm11}, T_{mm12}, \ldots, T_{mm1n}]$ corresponding to a speed array $[V_{m10}, V_{m11}, V_{m12}, \ldots, V_{m1n}]$ may be calculated by the interpolation according to the relationship between M1_max and V, in which $V_{m10}$ represents a minimum speed (the value of which is 0) at each gear when the motor M1 operates at the minimum stable rotary speed, $V_{m1n}$ represents a maximum speed at each gear when the motor M1 operates at the maximum rotary speed. $[V_{m10}, V_{m11}, V_{m12}, \ldots, V_{m1n}]$ and $[T_{mm10}, T_{mm11}, T_{mm12}, \ldots, T_{mm1n}]$ form a one-dimensional interpolation table M1_1.

The engine minimum torque $T_{en}$ curve represents the corresponding relationship between the torque and the rotary speed when the engine operates at a minimum torque under the emission limit. If the torque is below this curve, the emission of the engine is poor, so the engine is prevented from operating in this area. A corresponding relationship of torques obtained at wheels when the engine operates according to the engine minimum torque $T_{en}$ curve and the speeds V at each gear may be calculated according to the $T_{en}$ curve, the wheel radius, the transmission efficiency, each gear ratio and the speed ratio of the main reducer, and then a smallest one of the torques corresponding to each speed V is selected and the envelope smoothing is performed to obtain the relationship between a minimum torque $T_{en\_w}$ and the speed V. A speed array $[V_{e0}, V_{e1}, V_{e2}, \ldots, V_{en}]$ is given, in which $V_{e0}$ represents a minimum speed when the engine operates at the idle speed and $V_{en}$ represents a maximum speed when the engine operates at the maximum rotary speed. A torque array $[T_{en0}, T_{en1}, T_{en2}, \ldots, T_{enn}]$ corresponding to the speed array $[V_{e0}, V_{e1}, V_{e2}, \ldots, V_{en}]$ may be calculated by the interpolation according to the corresponding relationship between $T_{en\_w}$ and V, and $[V_{e0}, V_{e1}, V_{e2}, \ldots, V_{en}]$ and $[T_{en0}, T_{en1}, T_{en2}, \ldots, T_{enn}]$ form a one-dimensional interpolation table E_3. The larger of $V_{m10}$ and $V_{e0}$ is denoted as $V_{em10}$, the smaller of $V_{m1n}$ and $V_{en}$ is denoted as $V_{em1n}$, and a speed array $[V_{em10}, V_{em11}, V_{em12}, \ldots, V_{em1n}]$ is formed ranging from $V_{em10}$ to $V_{em1n}$, in which three torque arrays $[T_{m1me0}, T_{m1me1}, T_{m1me2}, \ldots, T_{m1men}]$, $[T_{eom10}, T_{eom11}, T_{eom12}, \ldots, T_{eom1n}]$ and $[T_{enm10}, T_{enm11}, T_{enm12}, \ldots, T_{enm1n}]$ are obtained after interpolating the speed array $[V_{em10}, V_{em11}, V_{em12}, \ldots, V_{em1n}]$ according respectively to the interpolation table M1_1, E_2 and E_3. A difference of $[T_{eom10}, T_{eom11}, T_{eom12}, \ldots, T_{eom1n}]$ and $[T_{m1me0}, T_{m1me1}, T_{m1me2}, \ldots, T_{m1men}]$ is denoted as $[T_{eodm1m0}, T_{eodm1m1}, T_{eodm1m2}, \ldots, T_{eodm1mn}]$. By selecting the bigger of each two corresponding elements respectively in $[T_{eodm1m0}, T_{eodm1m1}, T_{eodm1m2}, \ldots, T_{eodm1mn}]$ and $[T_{enm10}, T_{enm11}, T_{enm12}, \ldots, T_{enm1n}]$, an array $[T_{emdmax0}, T_{emdmax1}, T_{emdmax2}, \ldots, T_{emdmaxn}]$ may be formed. The element in $[T_{enm10}, T_{enm11}, T_{enm12}, \ldots, T_{enm1n}]$ is less than or equal to the corresponding element in $[T_{emdmax0}, T_{emdmax1}, T_{emdmax2}, \ldots, T_{emdmaxn}]$, and by selecting a value between the corresponding elements respectively in the above two arrays, for example, $T_{emg0}$ which is between $T_{eom10}$ and $T_{emdmax0}$ is selected, $T_{emgn}$ which is between $T_{eom1n}$ and $T_{emdmaxn}$ is selected, an array $[T_{emg0}, T_{emg1}, T_{emg2}, \ldots, T_{emgn}]$ may be formed. $[V_{em10}, V_{em11}, V_{em12}, \ldots, V_{em1n}]$ and $[T_{emg0}, T_{emg1}, T_{emg2}, \ldots, T_{emgn}]$ form a one-dimensional interpolation table EM1g. The corresponding torque $T_k'$ may be obtained by the interpolation according to the interpolation table EM1g after inputting the real-time speed, and $T_j'$ is a multiple of $T_k'$, typically the multiplying power is 95%, such that the fre-quent switching of the operation mode may be avoided. It should be noted that, in some embodiments of the present disclosure, when performing the actual vehicle calibration, all or some values in $[T_{emg0}, T_{emg1}, T_{emg2}, \ldots, T_{emgn}]$ are changed, the value of $T_k'$ corresponding to the same speed may change and the change of $T_k'$ may cause a change of mode switching thresholds.

(6) Process of Determining the Thirty-First Preset Torque $T_m'$ and the Thirty-Second Preset Torque $T_n'$ $T_n'$ may be obtained by the interpolation according to the interpolation table E_1 after inputting the real-time speed, and $T_m'$ is a multiple of $T_n'$, typically the multiplying power is 95%, such that the frequent switching of the operation mode may be avoided.

(7) Process of Determining the Thirty-Third Preset Torque $T_o'$ and the Thirty-Fourth Preset Torque $T_p'$ A sum of $[T_{mme0}, T_{mme1}, T_{mme2}, \ldots, T_{mmen}]$ and $[T_{emm0}, T_{emm1}, T_{emm2}, \ldots, T_{emmn}]$ is denoted as $[T_{mmaem0}, T_{mmaem1}, T_{mmaem2}, \ldots, T_{mmaemn}]$, and $[V_{em0}, V_{em1}, V_{em2}, \ldots, V_{emn}]$ and $[T_{mmaem0}, T_{mmaem1}, T_{mmaem2}, \ldots, T_{mmaemn}]$ form a one-dimensional interpolation table EMaMM. $T_p'$ may be obtained by the interpolation according to the interpolation table EMaMM after inputting the real-time speed, and $T_o'$ is a multiple of $T_p'$, typically the multiplying power is 95%, such that the frequent switching of the operation mode may be avoided.

(8) Process of Determining the Thirty-Fifth Preset Torque $T_q'$ and the Thirty-Sixth Preset Torque $T_r'$ The process of determining $[T_{mmfs0}, T_{mmfs1}, T_{mmfs2}, \ldots, T_{mmfsn}]$ is the same as that in the process of determining the twenty-eighth preset torque $T_h'$. When performing the actual vehicle calibration, all or some values in $[T_{mmfs0}, T_{mmfs1}, T_{mmfs2}, \ldots, T_{mmfsn}]$ are multiplied by a factor in a range of 0~1 to form an array $[T_{mmrs0}, T_{mmrs1}, T_{mmrs2}, \ldots, T_{mmrsn}]$, and $[V_{m0}, V_{m1}, V_{m2}, \ldots, V_{mn}]$ and $[T_{mmrs0}, T_{mmrs1}, T_{mmrs2}, \ldots, T_{mmrsn}]$ form a one-dimensional interpolation table M2r_sh. $T_r'$ may be obtained by the interpolation according to the interpolation table M2r_sh after inputting the real-time speed, and $T_q'$ is a multiple of $T_r'$, typically the multiplying power is 95% such that the frequent switching of the operation mode may be avoided.

(9) Process of Determining the Thirty-Seventh Preset Torque $T_s'$ and the Thirty-Eighth Preset Torque $T_t'$ The process of determining the thirty-seventh preset torque $T_s'$ and the thirty-eighth preset torque $T_t'$ are the same as that of determining the twenty-ninth preset torque $T_j'$ and the thirtieth preset torque $T_k'$.

(10) Process of Determining the Thirty-Ninth Preset Torque $T_u'$ and the Fortieth Preset Torque $T_v'$ The process of determining the thirty-ninth preset torque $T_u'$ and the fortieth preset torque $T_v'$ are the same as that of determining the thirty-first preset torque $T_m'$ and the thirty-second preset torque $T_n'$.

The technical problem solved by the method for controlling an operation mode of a hybrid electric vehicle according to embodiments of the present disclosure is that, a correct operation mode of the hybrid electric vehicle under the driving condition is determined according to structural characteristics of the hybrid electric vehicle and by adopting four parameters, i.e. the state of charge, the expected torque at wheels, a state at the current time (i.e. the current operation mode) and the duration of the state (i.e. the duration of the current operation mode); methods for calibrating and debugging threshold values in each operation mode are determined, and the balance of increasing the power consumption and improving the operating efficiency of the engine may be found, so that the vehicle may be under the optimal mode in real-time and the fuel economy is improved while the frequent switching of the operation mode is avoided and the degree of comfort is improved.

The method for controlling an operation mode of a hybrid electric vehicle according to embodiments of the present disclosure has advantageous effects as follows. (1) The operation mode may be determined by adopting four controlling parameters, i.e. the current state of charge, the expected torque at wheels, the current operation mode and the duration of the current operation mode, in which the problems of frequently switching from one operation mode to another operation mode may be avoided by adopting two controlling parameters, i.e. the current operation mode and the duration of the current operation mode. (2) During a process of controlling the current state of charge, both general operating conditions and the vehicle starting process are taken into account. During the vehicle starting process, if the current state of charge is slightly lower than the target value, the pure motor operating conditions may be adopted and the vehicle has the good comprehensive performance at this moment; if the current state of charge is far lower than the target value, the pure motor operating conditions cannot be adopted to avoid the fault that the battery is under charge. (3) The conditions of switching from one operation mode to another operation mode can be calibrated easily, which is conducive to the actual vehicle calibration, and by performing the actual vehicle the calibration a balance of increasing the power consumption and improving the operating efficiency may be found, thus improving the fuel economy of the vehicle. (4) The consideration is comprehensive, which ensures that the operation modes may be distributed properly in the coordinate plane of the state of charge and the expected torque and the conditions are easy to determine.

Corresponding to the methods for controlling an operation mode of a hybrid electric vehicle, embodiments of the present disclosure also provide an apparatus for controlling an operation mode of a hybrid electric vehicle. Since the apparatus for controlling an operation mode of a hybrid electric vehicle corresponds to the method for controlling an operation mode of a hybrid electric vehicle, the specific manners of the apparatus for controlling an operation mode of a hybrid electric vehicle therein have been described in detail in the embodiments regarding the methods for controlling an operation mode of a hybrid electric vehicle, which are not elaborated herein again.

Figure 8:
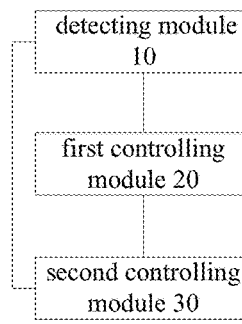
FIG. 8 is a block diagram of an apparatus for controlling an operation mode of a hybrid electric vehicle according to an embodiment of the present disclosure.

FIG. 8 is a block diagram of an apparatus for controlling an operation mode of a hybrid electric vehicle according to an embodiment of the present disclosure. As shown in FIG. 8, the apparatus for controlling an operation mode of a hybrid electric vehicle may include a detecting module 10, a first controlling module 20 and a second controlling module 30.

Specifically, the detecting module 10 is configured to detect a current state of charge of a power battery and an expected torque at wheels in the hybrid electric vehicle.

The first controlling module 20 is configured to maintain a current operation mode of the hybrid electric vehicle if the detecting module 10 detects that the current state of charge enters a state hysteresis area or the expected torque at wheels enters a torque hysteresis area.

The second controlling module 30 is configured to obtain a duration of the current operation mode and determine a next operation mode of the hybrid electric vehicle according to the duration, the current state of charge and the expected torque at wheels if the detecting module 10 detects that the current state of charge exits the state hysteresis area and the expected torque at wheels exits the torque hysteresis area.

In some embodiments, the second controlling module 30 includes a judging unit, a maintaining unit and a switching unit (not shown in FIG. 8).

The judging unit is configured to judge whether the duration exceeds a preset period. The maintaining unit is configured to maintain continually the current operation mode if the judging unit judges that the duration does not exceed the preset period. The switching unit is configured to determine the next operation mode according to the current state of charge and the expected torque at wheels and to switch to the next operation mode, if the judging unit judges that the duration exceeds the preset period.

In some embodiments of the present disclosure, the apparatus may be applied to a parallel hybrid electric vehicle, a four-wheel drive hybrid electric vehicle, or other hybrid electric vehicles. In some embodiments of the present disclosure, different hybrid electric vehicles correspond to different hysteresis areas and different operation modes (the following embodiments may be described respectively), which may be determined according to specific situations.

In the following, processes using the apparatus according to embodiments of the present disclosure in the parallel hybrid electric vehicle and the four-wheel drive hybrid electric will be described respectively.

As shown in FIG. 4, a power assembly of the parallel hybrid electric vehicle includes an engine E, an automatic clutch C, a motor M, an automatic mechanical transmission AMT and a main reducer F.

As shown in FIG. 5, a front axle assembly of the four-wheel drive hybrid electric vehicle includes an engine E, an integrated starter generator M1, an automatic transmission assembly and a first differential; a rear axle assembly of the four-wheel drive hybrid electric vehicle includes a rear-wheel drive motor M2, a single-stage reducer and a second differential.

Parallel Hybrid Electric Vehicle

The operation modes of the parallel hybrid electric vehicle includes a pure motor mode, a pure engine mode, a first mode with the motor driving and the engine operating at a fuel economy tending to an optimum fuel economy, a second mode with the motor driving and the engine operating at a maximum power, a third mode with the motor generating electricity and the engine operating at the fuel economy tending to the optimum fuel economy and a fourth mode with the engine operating at the maximum power.

In an embodiment of the present disclosure, the switching unit is further configured to:

determine the pure motor mode as the next operation mode if the current state of charge is greater than a first preset state of charge threshold and the expected torque at wheels is less than a first preset torque;

determine the pure engine mode as the next operation mode if the current state of charge is greater than the first preset state of charge threshold and the expected torque at wheels is greater than a second preset torque and less than a third preset torque;

determine the first mode with the motor driving and the engine operating at the fuel economy tending to the optimum fuel economy as the next operation mode if the current state of charge is greater than the first preset state of charge threshold and the expected torque at wheels is greater than a fourth preset torque and less than a fifth preset torque;

determine the second mode with the motor driving and the engine operating at the maximum power as the next operation mode is the mode power-assisted by the motor and having the engine with the maximum power if the current state of charge is greater than the first preset state of charge threshold and the expected torque at wheels is greater than a sixth preset torque;

determine the pure motor mode as the next operation mode if the current state of charge is greater than a third preset state of charge threshold and less than a second preset state of charge threshold and the expected torque at wheels is less than a seventh preset torque;

determine the third mode with the motor generating electricity and the engine operating at the fuel economy tending to the optimum fuel economy as the next operation mode if the current state of charge is greater than the third preset state of charge threshold and less than the second preset state of charge threshold and the expected torque at wheels is greater than an eighth preset torque and less than a ninth preset torque;

determine the pure engine mode as the next operation mode if the current state of charge is greater than the third preset state of charge threshold and less than the second preset state of charge threshold and the expected torque at wheels is greater than a tenth preset torque and less than an eleventh preset torque;

determine the second mode with the motor driving and the engine operating at the maximum power as the next operation mode if the current state of charge is greater than the third preset state of charge threshold and less than the second preset state of charge threshold and the expected torque at wheels is greater than a twelfth preset torque;

determine the third mode with the motor generating electricity and the engine operating at the fuel economy tending to the optimum fuel economy as the next operation mode if the current state of charge is less than a fourth preset state of charge threshold and the expected torque at wheels is less than a thirteenth preset torque;

determine the pure engine mode as the next operation mode if the current state of charge is less than the fourth preset state of charge threshold and the expected torque at wheels is greater than a fourteenth preset torque and less than a fifteenth preset torque;

determine the fourth mode with the engine operating at the maximum power as the next operation mode if the current state of charge is less than the fourth preset state of charge threshold and the expected torque at wheels is greater than a sixteenth preset torque.

In some embodiments, the first preset state of charge threshold, the second preset state of charge threshold, the third preset state of charge threshold and the fourth preset state of charge threshold are respectively determined according to a capacity and a type of the power battery in the parallel hybrid electric vehicle; the first preset torque, the second preset torque, the third preset torque, the fourth preset torque, the fifth preset torque, the sixth preset torque, the seventh preset torque, the eighth preset torque, the ninth preset torque, the tenth preset torque, the eleventh preset torque, the twelfth preset torque, the thirteenth preset torque, the fourteenth preset torque, the fifteenth preset torque and the sixteenth preset torque are respectively determined by performing an actual vehicle calibration according to maximum torque characteristics of the motor, a wheel radius, a transmission efficiency, each gear ratio and a speed ratio of the main reducer.

Four-Wheel Drive Hybrid Electric Vehicle

The operation modes of the four-wheel drive hybrid electric vehicle includes a pure rear-wheel drive motor mode, a pure engine mode, a fifth mode with the rear-wheel drive motor driving and the engine operating at a fuel economy tending to an optimum fuel economy, a sixth mode with the rear-wheel drive motor and the integrated starter generator driving and the engine operating at the fuel economy tending to the optimum fuel economy, a series mode, a seventh mode with the integrated starter generator generating electricity and the engine operating at the fuel economy tending to the optimum fuel economy, an eighth mode with the rear-wheel drive motor driving and the engine operating at a maximum power, a ninth mode with the rear-wheel drive motor and the integrated starter generator driving and the engine operating at the maximum power and a tenth mode with the engine operating at the maximum power.

In some embodiments of the present disclosure, the switching unit is further configured to:

determine the pure rear-wheel drive motor mode as the next operation mode if the current state of charge is greater than the fifth preset state of charge threshold and the expected torque at wheels is less than a twenty-first preset torque;

determine the pure engine mode as the next operation mode if the current state of charge is greater than the fifth preset state of charge threshold and the expected torque at wheels is greater than a twenty-second preset torque and less than a twenty-third preset torque;

determine the fifth mode with the rear-wheel drive motor driving and the engine operating at the fuel economy tending to the optimum fuel economy as the next operation mode if the current state of charge is greater than the fifth preset state of charge threshold and the expected torque at wheels is greater than a twenty-fourth preset torque and less than a twenty-fifth preset torque;

determine the sixth mode with the rear-wheel drive motor and the integrated starter generator driving and the engine operating at the fuel economy tending to the optimum fuel economy as the next operation mode if the current state of charge is greater than the fifth preset state of charge threshold and the expected torque at wheels is greater than a twenty-sixth preset torque;

determine the pure rear-wheel drive motor mode or the series mode as the next operation mode if the current state of charge is greater than a seventh preset state of charge threshold and less than a sixth preset state of charge threshold and the expected torque at wheels is less than a twenty-seventh preset torque;

determine the seventh mode with the integrated starter generator generating electricity and the engine operating at the fuel economy tending to the optimum fuel economy as the next operation mode if the current state of charge is greater than the seventh preset state of charge threshold and less than the sixth preset state of charge threshold and the expected torque at wheels is greater than a twenty-eighth preset torque and less than a twenty-ninth preset torque;

determine the pure engine mode as the next operation mode if the current state of charge is greater than the seventh preset state of charge threshold and less than the sixth preset state of charge threshold and the expected torque at wheels is greater than a thirtieth preset torque and less than a thirty-first preset torque;

determine the eighth mode with the rear-wheel drive motor driving and the engine operating at the maximum power as the next operation mode if the current state of charge is greater than the seventh preset state of charge threshold and less than the sixth preset state of charge threshold and the expected torque at wheels is greater than a thirty-second preset torque and less than a thirty-third preset torque;

determine the ninth mode with the rear-wheel drive motor and the integrated starter generator driving and the engine operating at the maximum power as the next operation mode if the current state of charge is greater than the seventh preset state of charge threshold and less than the sixth preset state of charge threshold and the expected torque at wheels is greater than a thirty-fourth preset torque;

determine the series mode as the next operation mode if the current state of charge is less than an eighth preset state of charge threshold and the expected torque at wheels is less than a thirty-fifth preset torque;

determine the seventh mode with the integrated starter generator generating electricity and the engine operating at the fuel economy tending to the optimum fuel economy as the next operation mode if the current state of charge is less than the eighth preset state of charge threshold and the expected torque at wheels is greater than a thirty-sixth preset torque and less than a thirty-seventh preset torque;

determine the pure engine mode as the next operation mode if the current state of charge is less than the eighth preset state of charge threshold and the expected torque at wheels is greater than a thirty-eighth preset torque and less than a thirty-ninth preset torque;

determine the tenth mode with the engine operating at the maximum power as the next operation mode if the current state of charge is less than the eighth preset state of charge threshold and the expected torque at wheels is greater than a fortieth preset torque.

In some embodiments of the present disclosure, the fifth preset state of charge threshold, the sixth preset state of charge threshold, the seventh preset state of charge threshold and the eighth preset state of charge threshold are respectively determined according to a capacity and a type of the power battery in the four-wheel drive hybrid electric vehicle. The twenty-first preset torque, the twenty-second preset torque, the twenty-third preset torque, the twenty-fourth preset torque, the twenty-fifth preset torque, the twenty-sixth preset torque, the twenty-seventh preset torque, the twenty-eighth preset torque, the twenty-ninth preset torque, the thirtieth preset torque, the thirty-first preset torque, the thirty-second preset torque, the thirty-third preset torque, the thirty-fourth preset torque, the thirty-fifth preset torque, the thirty-sixth preset torque, the thirty-seventh preset torque, the thirty-eighth preset torque, the thirty-ninth preset torque and the fortieth preset torque are respectively determined by performing an actual vehicle calibration according to maximum torque characteristics of the rear-wheel drive motor, a wheel radius, a transmission efficiency, each gear ratio and a speed ratio of a main reducer.

The apparatus for controlling an operation mode of a hybrid electric vehicle according to embodiments of the present disclosure has advantageous effects as follows. (1) The operation mode may be determined by adopting four controlling parameters, i.e. the current state of charge, the expected torque at wheels, the current operation mode and the duration of the current operation mode, in which the problems of frequently switching from one operation mode to another operation mode may be avoided by adopting two controlling parameters, i.e. the current operation mode and the duration of the current operation mode. (2) During a process of controlling the current state of charge, both general operating conditions and the vehicle starting process are taken into account. During the vehicle starting process, if the current state of charge is slightly lower than the target value, the pure motor operating conditions may be adopted and the vehicle has the good comprehensive performance at this moment; if the current state of charge is far lower than the target value, the pure motor operating conditions cannot be adopted to avoid the fault that the battery is under charge. (3) The conditions of switching from one operation mode to another operation mode can be calibrated easily, which is conducive to the actual vehicle calibration, and by performing the actual vehicle the calibration a balance of increasing the power consumption and improving the operating efficiency may be found, thus improving the fuel economy of the vehicle. (4) The consideration is comprehensive, which ensures that the operation modes may be distributed properly in the coordinate plane of the state of charge and the expected torque and the conditions are easy to determine.

In order to realize the above embodiments, embodiments of the present disclosure also provide a parallel hybrid electric vehicle, including the apparatus for controlling an operation mode of a hybrid electric vehicle according to the above embodiments.

In order to realize the above embodiments, embodiments of the present disclosure also provide a four-wheel drive hybrid electric vehicle, including the apparatus for controlling an operation mode of a hybrid electric vehicle according to the above embodiments.

In addition, terms such as "first" and "second" are used herein for purposes of description and are not intended to indicate or imply relative importance or significance, or implicitly indicate the amount of the technical features. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment", "some embodiments", "one embodiment", "another example", "an example", "a specific example", or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example", or "in some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method performed by a computing device for controlling an operation mode of a hybrid electric vehicle, comprising:
   detecting a current state of charge of a power battery and an expected torque at wheels in the hybrid electric vehicle;
   maintaining a current operation mode of the hybrid electric vehicle, if it is detected that the current state of charge enters a state hysteresis area or the expected torque at wheels enters a torque hysteresis area;
   obtaining a duration of the current operation mode and determining a next operation mode of the hybrid electric vehicle according to the duration, the current state of charge and the expected torque at wheels, if it is detected that the current state of charge exits the state hysteresis area and the expected torque at wheels exits the torque hysteresis area;
   wherein the determining a next operation mode of the hybrid electric vehicle according to the duration, the current state of charge and the expected torque at wheels comprises:
      judging whether the duration exceeds a preset period;
      maintaining continually the current operation mode if the duration does not exceed the preset period; and
      determining the next operation mode according to the current state of charge and the expected torque at wheels and switching to the next operation mode, if the duration exceeds the preset period.

2. The method according to claim 1, wherein the hybrid electric vehicle is a parallel hybrid electric vehicle and a power assembly of the parallel hybrid electric vehicle comprises an engine, an automatic clutch, a motor, an automatic mechanical transmission and a main reducer.

3. The method according to claim 2, wherein operation modes of the parallel hybrid electric vehicle comprise a pure motor mode, a pure engine mode, a first mode with the motor driving and the engine operating at a fuel economy tending to an optimum fuel economy, a second mode with the motor driving and the engine operating at a maximum power, a third mode with the motor generating electricity and the engine operating at the fuel economy tending to the optimum fuel economy, a fourth mode with the engine operating at the maximum power,
   wherein the determining the next operation mode according to the current state of charge and the expected torque at wheels comprises:
      determining the pure motor mode as the next operation mode if the current state of charge is greater than a first preset state of charge threshold and the expected torque at wheels is less than a first preset torque;
      determining the pure engine mode as the next operation mode if the current state of charge is greater than the first preset state of charge threshold and the expected torque at wheels is greater than a second preset torque and less than a third preset torque;
      determining the first mode as the next operation mode if the current state of charge is greater than the first preset state of charge threshold and the expected torque at wheels is greater than a fourth preset torque and less than a fifth preset torque;
      determining the second mode as the next operation mode if the current state of charge is greater than the first preset state of charge threshold and the expected torque at wheels is greater than a sixth preset torque;
      determining the pure motor mode as the next operation mode if the current state of charge is greater than a third preset state of charge threshold and less than a second preset state of charge threshold and the expected torque at wheels is less than a seventh preset torque;
      determining the third mode as the next operation mode if the current state of charge is greater than the third preset state of charge threshold and less than the second preset state of charge threshold and the expected torque at wheels is greater than an eighth preset torque and less than a ninth preset torque;
      determining the pure engine mode as the next operation mode if the current state of charge is greater than the third preset state of charge threshold and less than the second preset state of charge threshold and the expected torque at wheels is greater than a tenth preset torque and less than an eleventh preset torque;
      determining the second mode as the next operation mode if the current state of charge is greater than the third preset state of charge threshold and less than the second preset state of charge threshold and the expected torque at wheels is greater than a twelfth preset torque;
      determining the third mode as the next operation mode if the current state of charge is less than a fourth preset state of charge threshold and the expected torque at wheels is less than a thirteenth preset torque;
      determining the pure engine mode as the next operation mode if the current state of charge is less than the fourth preset state of charge threshold and the expected torque at wheels is greater than a fourteenth preset torque and less than a fifteenth preset torque;
      determining the fourth mode as the next operation mode if the current state of charge is less than the fourth preset state of charge threshold and the expected torque at wheels is greater than a sixteenth preset torque;
      wherein the first preset state of charge threshold is greater than the second preset state of charge threshold, the third preset state of charge threshold is greater than the fourth preset state of charge threshold; the first preset torque is less than the second preset torque, the third preset torque is less than the fourth preset torque, the fifth preset torque is less than the sixth preset torque, the seventh preset torque is less than the eighth preset torque, the ninth preset torque is less than the tenth preset torque, the eleventh preset torque is less than the twelfth preset torque, the thirteenth preset torque is less than the fourteenth preset torque, and the fifteenth preset torque is less than the sixteenth preset torque.

4. The method according to claim 3, wherein the first preset state of charge threshold, the second preset state of charge threshold, the third preset state of charge threshold and the fourth preset state of charge threshold are respectively determined according to a capacity and a type of the power battery in the parallel hybrid electric vehicle;
   wherein the first preset torque, the second preset torque, the third preset torque, the fourth preset torque, the fifth preset torque, the sixth preset torque, the seventh preset torque, the eighth preset torque, the ninth preset torque, the tenth preset torque, the eleventh preset torque, the twelfth preset torque, the thirteenth preset torque, the fourteenth preset torque, the fifteenth preset torque and the sixteenth preset torque are respectively determined by performing an actual vehicle calibration according to maximum torque characteristics of the motor, a wheel radius, a transmission efficiency, each gear ratio and a speed ratio of the main reducer.

5. The method according to claim 1, wherein the hybrid electric vehicle is a four-wheel drive hybrid electric vehicle, in which a front axle assembly of the four-wheel drive hybrid electric vehicle comprises an engine, an integrated starter generator, an automatic transmission assembly and a first differential; a rear axle assembly of the four-wheel drive hybrid electric vehicle comprises a rear-wheel drive motor, a single-stage reducer and a second differential.

6. The method according to claim 5, wherein operation modes of the four-wheel drive hybrid electric vehicle comprise a pure rear-wheel drive motor mode, a pure engine mode, a fifth mode with the rear-wheel drive motor driving and the engine operating at a fuel economy tending to an optimum fuel economy, a sixth mode with the rear-wheel drive motor and the integrated starter generator driving and the engine operating at the fuel economy tending to the optimum fuel economy, a series mode, a seventh mode with the integrated starter generator generating electricity and the engine operating at the fuel economy tending to the optimum fuel economy, an eighth mode with the rear-wheel drive motor driving and the engine operating at a maximum power, a ninth mode with the rear-wheel drive motor and the integrated starter generator driving and the engine operating at the maximum power and a tenth mode with the engine operating at the maximum power, wherein the determining the next operation mode according to the current state of charge and the expected torque at wheels comprises:

determining the pure rear-wheel drive motor mode as the next operation mode if the current state of charge is greater than a fifth preset state of charge threshold and the expected torque at wheels is less than a twenty-first preset torque;

determining the pure engine mode as the next operation mode if the current state of charge is greater than the fifth preset state of charge threshold and the expected torque at wheels is greater than a twenty-second preset torque and less than a twenty-third preset torque;

determining the fifth mode as the next operation mode if the current state of charge is greater than the fifth preset state of charge threshold and the expected torque at wheels is greater than a twenty-fourth preset torque and less than a twenty-fifth preset torque;

determining the sixth mode as the next operation mode if the current state of charge is greater than the fifth preset state of charge threshold and the expected torque at wheels is greater than a twenty-sixth preset torque;

determining the pure rear-wheel drive motor mode or the series mode as the next operation mode if the current state of charge is greater than a seventh preset state of charge threshold and less than a sixth preset state of charge threshold and the expected torque at wheels is less than a twenty-seventh preset torque;

determining the seventh mode as the next operation mode if the current state of charge is greater than the seventh preset state of charge threshold and less than the sixth preset state of charge threshold and the expected torque at wheels is greater than a twenty-eighth preset torque and less than a twenty-ninth preset torque;

determining the pure engine mode as the next operation mode if the current state of charge is greater than the seventh preset state of charge threshold and less than the sixth preset state of charge threshold and the expected torque at wheels is greater than a thirtieth preset torque and less than a thirty-first preset torque;

determining the eighth mode as the next operation mode if the current state of charge is greater than the seventh preset state of charge threshold and less than the sixth preset state of charge threshold and the expected torque at wheels is greater than a thirty-second preset torque and less than a thirty-third preset torque;

determining the ninth mode as the next operation mode if the current state of charge is greater than the seventh preset state of charge threshold and less than the sixth preset state of charge threshold and the expected torque at wheels is greater than a thirty-fourth preset torque;

determining the series mode as the next operation mode if the current state of charge is less than an eighth preset state of charge threshold and the expected torque at wheels is less than a thirty-fifth preset torque;

determining the seventh mode as the next operation mode if the current state of charge is less than the eighth preset state of charge threshold and the expected torque at wheels is greater than a thirty-sixth preset torque and less than a thirty-seventh preset torque;

determining the pure engine mode as the next operation mode if the current state of charge is less than the eighth preset state of charge threshold and the expected torque at wheels is greater than a thirty-eighth preset torque and less than a thirty-ninth preset torque;

determining the tenth mode as the next operation mode if the current state of charge is less than the eighth preset state of charge threshold and the expected torque at wheels is greater than a fortieth preset torque;

wherein the fifth preset state of charge threshold is greater than the sixth preset state of charge threshold, the seventh preset state of charge threshold is greater than the eighth preset state of charge threshold; the twenty-first preset torque is less than the twenty-second preset torque, the twenty-third preset torque is less than the twenty-fourth preset torque, the twenty-fifth preset torque is less than the twenty-sixth preset torque, the twenty-seventh preset torque is less than the twenty-eighth preset torque, the twenty-ninth preset torque is less than the thirtieth preset torque, the thirty-first preset torque is less than the thirty-second preset torque, the thirty-third preset torque is less than the thirty-fourth preset torque, the thirty-fifth preset torque is less than the thirty-sixth preset torque, the thirty-seventh preset torque is less than the thirty-eighth preset torque, and the thirty-ninth preset torque is less than the fortieth preset torque.

7. The method according to claim 6, wherein the fifth preset state of charge threshold, the sixth preset state of charge threshold, the seventh preset state of charge threshold and the eighth preset state of charge threshold are respectively determined according to a capacity and a type of the power battery in the four-wheel drive hybrid electric vehicle;

wherein the twenty-first preset torque, the twenty-second preset torque, the twenty-third preset torque, the twenty-fourth preset torque, the twenty-fifth preset torque, the twenty-sixth preset torque, the twenty-seventh preset torque, the twenty-eighth preset torque, the twenty-ninth preset torque, the thirtieth preset torque, the thirty-first preset torque, the thirty-second preset torque, the thirty-third preset torque, the thirty-fourth preset torque, the thirty-fifth preset torque, the thirty-sixth preset torque, the thirty-seventh preset torque, the thirty-eighth preset torque, the thirty-ninth preset torque and the fortieth preset torque are respectively determined by performing an actual vehicle calibration according to maximum torque characteristics of the rear-wheel drive motor, a wheel radius, a transmission efficiency, each gear ratio and a speed ratio of a main reducer.

8. An apparatus for controlling an operation mode of a hybrid electric vehicle, comprising:
a detecting module, configured to detect a current state of charge of a power battery and an expected torque at wheels in the hybrid electric vehicle;
a first controlling module, configured to maintain a current operation mode of the hybrid electric vehicle if the detecting module detects that the current state of charge enters a state hysteresis area or the expected torque at wheels enters a torque hysteresis area;
a second controlling module, configured to obtain a duration of the current operation mode and determine a next operation mode of the hybrid electric vehicle according to the duration, the current state of charge and the expected torque at wheels if the detecting module detects that the current state of charge exits the state hysteresis area and the expected torque at wheels exits the torque hysteresis area;
wherein the second controlling module comprises:
a judging unit, configured to judge whether the duration exceeds a preset period;
a maintaining unit, configured to maintain continually the current operation mode if the judging unit judges that the duration does not exceed the preset period; and
a switching unit, configured to determine the next operation mode according to the current state of charge and the expected torque at wheels and to switch to the next operation mode, if the judging unit judges that the duration exceeds the preset period.

9. The apparatus according to claim 8, wherein the hybrid electric vehicle is a parallel hybrid electric vehicle and a power assembly of the parallel hybrid electric vehicle comprises an engine, an automatic clutch, a motor, an automatic mechanical transmission and a main reducer.

10. The apparatus according to claim 9, wherein operation modes of the parallel hybrid electric vehicle comprise a pure motor mode, a pure engine mode, a first mode with the motor driving and the engine operating at a fuel economy tending to an optimum fuel economy, a second mode with the motor driving and the engine operating at a maximum power, a third mode with the motor generating electricity and the engine operating at the fuel economy tending to the optimum fuel economy, a fourth mode with the engine operating at the maximum power,
wherein the switching unit is further configured to:
determine the pure motor mode as the next operation mode if the current state of charge is greater than a first preset state of charge threshold and the expected torque at wheels is less than a first preset torque;
determine the pure engine mode as the next operation mode if the current state of charge is greater than the first preset state of charge threshold and the expected torque at wheels is greater than a second preset torque and less than a third preset torque;
determine the first mode as the next operation mode if the current state of charge is greater than the first preset state of charge threshold and the expected torque at wheels is greater than a fourth preset torque and less than a fifth preset torque;
determine the second mode as the next operation mode if the current state of charge is greater than the first preset state of charge threshold and the expected torque at wheels is greater than a sixth preset torque;
determine the pure motor mode as the next operation mode if the current state of charge is greater than a third preset state of charge threshold and less than a second preset state of charge threshold and the expected torque at wheels is less than a seventh preset torque;
determine the third mode as the next operation mode if the current state of charge is greater than the third preset state of charge threshold and less than the second preset state of charge threshold and the expected torque at wheels is greater than an eighth preset torque and less than a ninth preset torque;
determine the pure engine mode as the next operation mode if the current state of charge is greater than the third preset state of charge threshold and less than the second preset state of charge threshold and the expected torque at wheels is greater than a tenth preset torque and less than an eleventh preset torque;
determine the second mode as the next operation mode if the current state of charge is greater than the third preset state of charge threshold and less than the second preset state of charge threshold and the expected torque at wheels is greater than a twelfth preset torque;
determine the third mode as the next operation mode if the current state of charge is less than a fourth preset state of charge threshold and the expected torque at wheels is less than a thirteenth preset torque;
determine the pure engine mode as the next operation mode if the current state of charge is less than the fourth preset state of charge threshold and the expected torque at wheels is greater than a fourteenth preset torque and less than a fifteenth preset torque;
determine the fourth mode as the next operation mode if the current state of charge is less than the fourth preset state of charge threshold and the expected torque at wheels is greater than a sixteenth preset torque;
wherein the first preset state of charge threshold is greater than the second preset state of charge threshold, the third preset state of charge threshold is greater than the fourth preset state of charge threshold; the first preset torque is less than the second preset torque, the third preset torque is less than the fourth preset torque, the fifth preset torque is less than the sixth preset torque, the seventh preset torque is less than the eighth preset torque, the ninth preset torque is less than the tenth preset torque, the eleventh preset torque is less than the twelfth preset torque, the thirteenth preset torque is less than the fourteenth preset torque, and the fifteenth preset torque is less than the sixteenth preset torque.

11. The apparatus according to claim 10, wherein the first preset state of charge threshold, the second preset state of charge threshold, the third preset state of charge threshold and the fourth preset state of charge threshold are respectively determined according to a capacity and a type of the power battery in the parallel hybrid electric vehicle;
wherein the first preset torque, the second preset torque, the third preset torque, the fourth preset torque, the fifth preset torque, the sixth preset torque, the seventh preset torque, the eighth preset torque, the ninth preset torque, the tenth preset torque, the eleventh preset torque, the twelfth preset torque, the thirteenth preset torque, the fourteenth preset torque, the fifteenth preset torque and the sixteenth preset torque are respectively determined by performing an actual vehicle calibration according to maximum torque characteristics of the motor, a wheel radius, a transmission efficiency, each gear ratio and a speed ratio of the main reducer.

12. The apparatus according to claim 8, wherein the hybrid electric vehicle is a four-wheel drive hybrid electric vehicle, in which a front axle assembly of the four-wheel drive hybrid electric vehicle comprises an engine, an integrated starter generator, an automatic transmission assembly and a first differential; a rear axle assembly of the four-wheel drive hybrid electric vehicle comprises a rear-wheel drive motor, a single-stage reducer and a second differential.

13. The apparatus according to claim 12, wherein operation modes of the four-wheel drive hybrid electric vehicle comprise a pure rear-wheel drive motor mode, a pure engine mode, a fifth mode with the rear-wheel drive motor driving and the engine operating at a fuel economy tending to an optimum fuel economy, a sixth mode with the rear-wheel drive motor and the integrated starter generator driving and the engine operating at the fuel economy tending to the optimum fuel economy, a series mode, a seventh mode with the integrated starter generator generating electricity and the engine operating at the fuel economy tending to the optimum fuel economy, an eighth mode with the rear-wheel drive motor driving and the engine operating at a maximum power, a ninth mode with the rear-wheel drive motor and the integrated starter generator driving and the engine operating at the maximum power and a tenth mode with the engine operating at the maximum power, wherein the switching unit is further configured to:
determine the pure rear-wheel drive motor mode as the next operation mode if the current state of charge is greater than a fifth preset state of charge threshold and the expected torque at wheels is less than a twenty-first preset torque;
determine the pure engine mode as the next operation mode if the current state of charge is greater than the fifth preset state of charge threshold and the expected torque at wheels is greater than a twenty-second preset torque and less than a twenty-third preset torque;
determine the fifth mode as the next operation mode if the current state of charge is greater than the fifth preset state of charge threshold and the expected torque at wheels is greater than a twenty-fourth preset torque and less than a twenty-fifth preset torque;
determine the sixth mode as the next operation mode if the current state of charge is greater than the fifth preset state of charge threshold and the expected torque at wheels is greater than a twenty-sixth preset torque;
determine pure rear-wheel drive motor mode or the series mode as the next operation mode if the current state of charge is greater than a seventh preset state of charge threshold and less than a sixth preset state of charge threshold and the expected torque at wheels is less than a twenty-seventh preset torque;
determine the seventh mode as the next operation mode if the current state of charge is greater than the seventh preset state of charge threshold and less than the sixth preset state of charge threshold and the expected torque at wheels is greater than a twenty-eighth preset torque and less than a twenty-ninth preset torque;
determine the pure engine mode as the next operation mode if the current state of charge is greater than the seventh preset state of charge threshold and less than the sixth preset state of charge threshold and the expected torque at wheels is greater than a thirtieth preset torque and less than a thirty-first preset torque;
determine the eighth mode as the next operation mode if the current state of charge is greater than the seventh preset state of charge threshold and less than the sixth preset state of charge threshold and the expected torque at wheels is greater than a thirty-second preset torque and less than a thirty-third preset torque;
determine the ninth mode as the next operation mode if the current state of charge is greater than the seventh preset state of charge threshold and less than the sixth preset state of charge threshold and the expected torque at wheels is greater than a thirty-fourth preset torque;
determine the series mode as the next operation mode if the current state of charge is less than an eighth preset state of charge threshold and the expected torque at wheels is less than a thirty-fifth preset torque;
determine the seventh mode as the next operation mode if the current state of charge is less than the eighth preset state of charge threshold and the expected torque at wheels is greater than a thirty-sixth preset torque and less than a thirty-seventh preset torque;
determine the pure engine mode as the next operation mode if the current state of charge is less than the eighth preset state of charge threshold and the expected torque at wheels is greater than a thirty-eighth preset torque and less than a thirty-ninth preset torque;
determine the tenth mode as the next operation mode if the current state of charge is less than the eighth preset state of charge threshold and the expected torque at wheels is greater than a fortieth preset torque;
wherein the fifth preset state of charge threshold is greater than the sixth preset state of charge threshold, the seventh preset state of charge threshold is greater than the eighth preset state of charge threshold; the twenty-first preset torque is less than the twenty-second preset torque, the twenty-third preset torque is less than the twenty-fourth preset torque, the twenty-fifth preset torque is less than the twenty-sixth preset torque, the twenty-seventh preset torque is less than the twenty-eighth preset torque, the twenty-ninth preset torque is less than the thirtieth preset torque, the thirty-first preset torque is less than the thirty-second preset torque, the thirty-third preset torque is less than the thirty-fourth preset torque, the thirty-fifth preset torque is less than the thirty-sixth preset torque, the thirty-seventh preset torque is less than the thirty-eighth preset torque, and the thirty-ninth preset torque is less than the fortieth preset torque.

14. The apparatus according to claim 13, wherein the fifth preset state of charge threshold, the sixth preset state of charge threshold, the seventh preset state of charge threshold and the eighth preset state of charge threshold are respectively determined according to a capacity and a type of the power battery in the four-wheel drive hybrid electric vehicle;
wherein the twenty-first preset torque, the twenty-second preset torque, the twenty-third preset torque, the twenty-fourth preset torque, the twenty-fifth preset torque, the twenty-sixth preset torque, the twenty-seventh preset torque, the twenty-eighth preset torque, the twenty-ninth preset torque, the thirtieth preset torque, the thirty-first preset torque, the thirty-second preset torque, the thirty-third preset torque, the thirty-fourth preset torque, the thirty-fifth preset torque, the thirty-sixth preset torque, the thirty-seventh preset torque, the thirty-eighth preset torque, the thirty-ninth preset torque and the fortieth preset torque are respectively determined by performing an actual vehicle calibration according to maximum torque characteristics of the rear-wheel drive motor, a wheel radius, a transmission efficiency, each gear ratio and a speed ratio of a main reducer.

15. A hybrid electric vehicle, comprising the apparatus for controlling an operation mode of the hybrid electric vehicle, and the apparatus comprising:
   a detecting module, configured to detect a current state of charge of a power battery and an expected torque at wheels in the hybrid electric vehicle;
   a first controlling module, configured to maintain a current operation mode of the hybrid electric vehicle if the detecting module detects that the current state of charge enters a state hysteresis area or the expected torque at wheels enters a torque hysteresis area;
   a second controlling module, configured to obtain a duration of the current operation mode and determine a next operation mode of the hybrid electric vehicle according to the duration, the current state of charge and the expected torque at wheels if the detecting module detects that the current state of charge exits the state hysteresis area and the expected torque at wheels exits the torque hysteresis area;
   wherein the second controlling module comprises:
      a judging unit, configured to judge whether the duration exceeds a preset period;
      a maintaining unit, configured to maintain continually the current operation mode if the judging unit judges that the duration does not exceed the preset period;
      a switching unit, configured to determine the next operation mode according to the current state of charge and the expected torque at wheels and to switch to the next operation mode, if the judging unit judges that the duration exceeds the preset period.

16. The hybrid electric vehicle according to claim 15, wherein the hybrid electric vehicle is a parallel hybrid electric vehicle and a power assembly of the parallel hybrid electric vehicle comprises an engine, an automatic clutch, a motor, an automatic mechanical transmission and a main reducer.

17. The hybrid electric vehicle according to claim 16, wherein operation modes of the parallel hybrid electric vehicle comprise a pure motor mode, a pure engine mode, a first mode with the motor driving and the engine operating at a fuel economy tending to an optimum fuel economy, a second mode with the motor driving and the engine operating at a maximum power, a third mode with the motor generating electricity and the engine operating at the fuel economy tending to the optimum fuel economy, a fourth mode with the engine operating at the maximum power,
   wherein the switching unit is further configured to:
   determine the pure motor mode as the next operation mode if the current state of charge is greater than a first preset state of charge threshold and the expected torque at wheels is less than a first preset torque;
   determine the pure engine mode as the next operation mode if the current state of charge is greater than the first preset state of charge threshold and the expected torque at wheels is greater than a second preset torque and less than a third preset torque;
   determine the first mode as the next operation mode if the current state of charge is greater than the first preset state of charge threshold and the expected torque at wheels is greater than a fourth preset torque and less than a fifth preset torque;
   determine the second mode as the next operation mode if the current state of charge is greater than the first preset state of charge threshold and the expected torque at wheels is greater than a sixth preset torque;
   determine the pure motor mode as the next operation mode if the current state of charge is greater than a third preset state of charge threshold and less than a second preset state of charge threshold and the expected torque at wheels is less than a seventh preset torque;
   determine the third mode as the next operation mode if the current state of charge is greater than the third preset state of charge threshold and less than the second preset state of charge threshold and the expected torque at wheels is greater than an eighth preset torque and less than a ninth preset torque;
   determine the pure engine mode as the next operation mode if the current state of charge is greater than the third preset state of charge threshold and less than the second preset state of charge threshold and the expected torque at wheels is greater than a tenth preset torque and less than an eleventh preset torque;
   determine the second mode as the next operation mode if the current state of charge is greater than the third preset state of charge threshold and less than the second preset state of charge threshold and the expected torque at wheels is greater than a twelfth preset torque;
   determine the third mode as the next operation mode if the current state of charge is less than a fourth preset state of charge threshold and the expected torque at wheels is less than a thirteenth preset torque;
   determine the pure engine mode as the next operation mode if the current state of charge is less than the fourth preset state of charge threshold and the expected torque at wheels is greater than a fourteenth preset torque and less than a fifteenth preset torque;
   determine the fourth mode as the next operation mode if the current state of charge is less than the fourth preset state of charge threshold and the expected torque at wheels is greater than a sixteenth preset torque;
   wherein the first preset state of charge threshold is greater than the second preset state of charge threshold, the third preset state of charge threshold is greater than the fourth preset state of charge threshold; the first preset torque is less than the second preset torque, the third preset torque is less than the fourth preset torque, the fifth preset torque is less than the sixth preset torque, the seventh preset torque is less than the eighth preset torque, the ninth preset torque is less than the tenth preset torque, the eleventh preset torque is less than the twelfth preset torque, the thirteenth preset torque is less than the fourteenth preset torque, and the fifteenth preset torque is less than the sixteenth preset torque.

18. The hybrid electric vehicle according to claim 17, wherein the first preset state of charge threshold, the second preset state of charge threshold, the third preset state of charge threshold and the fourth preset state of charge threshold are respectively determined according to a capacity and a type of the power battery in the parallel hybrid electric vehicle;
   wherein the first preset torque, the second preset torque, the third preset torque, the fourth preset torque, the fifth preset torque, the sixth preset torque, the seventh preset torque, the eighth preset torque, the ninth preset torque, the tenth preset torque, the eleventh preset torque, the twelfth preset torque, the thirteenth preset torque, the fourteenth preset torque, the fifteenth preset torque and the sixteenth preset torque are respectively determined by performing an actual vehicle calibration according to maximum torque characteristics of the motor, a wheel radius, a transmission efficiency, each gear ratio and a speed ratio of the main reducer.

19. The hybrid electric vehicle according to claim 15, wherein the hybrid electric vehicle is a four-wheel drive hybrid electric vehicle, in which a front axle assembly of the four-wheel drive hybrid electric vehicle comprises an engine, an integrated starter generator, an automatic transmission assembly and a first differential; a rear axle assembly of the four-wheel drive hybrid electric vehicle comprises a rear-wheel drive motor, a single-stage reducer and a second differential.

20. The hybrid electric vehicle according to claim 19, wherein operation modes of the four-wheel drive hybrid electric vehicle comprise a pure rear-wheel drive motor mode, a pure engine mode, a fifth mode with the rear-wheel drive motor driving and the engine operating at a fuel economy tending to an optimum fuel economy, a sixth mode with the rear-wheel drive motor and the integrated starter generator driving and the engine operating at the fuel economy tending to the optimum fuel economy, a series mode, a seventh mode with the integrated starter generator generating electricity and the engine operating at the fuel economy tending to the optimum fuel economy, an eighth mode with the rear-wheel drive motor driving and the engine operating at a maximum power, a ninth mode with the rear-wheel drive motor and the integrated starter generator driving and the engine operating at the maximum power and a tenth mode with the engine operating at the maximum power,
  wherein the switching unit is further configured to:
  determine the pure rear-wheel drive motor mode as the next operation mode if the current state of charge is greater than a fifth preset state of charge threshold and the expected torque at wheels is less than a twenty-first preset torque;
  determine the pure engine mode as the next operation mode if the current state of charge is greater than the fifth preset state of charge threshold and the expected torque at wheels is greater than a twenty-second preset torque and less than a twenty-third preset torque;
  determine the fifth mode as the next operation mode if the current state of charge is greater than the fifth preset state of charge threshold and the expected torque at wheels is greater than a twenty-fourth preset torque and less than a twenty-fifth preset torque;
  determine the sixth mode as the next operation mode if the current state of charge is greater than the fifth preset state of charge threshold and the expected torque at wheels is greater than a twenty-sixth preset torque;
  determine pure rear-wheel drive motor mode or the series mode as the next operation mode if the current state of charge is greater than a seventh preset state of charge threshold and less than a sixth preset state of charge threshold and the expected torque at wheels is less than a twenty-seventh preset torque;
  determine the seventh mode as the next operation mode if the current state of charge is greater than the seventh preset state of charge threshold and less than the sixth preset state of charge threshold and the expected torque at wheels is greater than a twenty-eighth preset torque and less than a twenty-ninth preset torque;
  determine the pure engine mode as the next operation mode if the current state of charge is greater than the seventh preset state of charge threshold and less than the sixth preset state of charge threshold and the expected torque at wheels is greater than a thirtieth preset torque and less than a thirty-first preset torque;
  determine the eighth mode as the next operation mode if the current state of charge is greater than the seventh preset state of charge threshold and less than the sixth preset state of charge threshold and the expected torque at wheels is greater than a thirty-second preset torque and less than a thirty-third preset torque;
  determine the ninth mode as the next operation mode if the current state of charge is greater than the seventh preset state of charge threshold and less than the sixth preset state of charge threshold and the expected torque at wheels is greater than a thirty-fourth preset torque;
  determine the series mode as the next operation mode if the current state of charge is less than an eighth preset state of charge threshold and the expected torque at wheels is less than a thirty-fifth preset torque;
  determine the seventh mode as the next operation mode if the current state of charge is less than the eighth preset state of charge threshold and the expected torque at wheels is greater than a thirty-sixth preset torque and less than a thirty-seventh preset torque;
  determine the pure engine mode as the next operation mode if the current state of charge is less than the eighth preset state of charge threshold and the expected torque at wheels is greater than a thirty-eighth preset torque and less than a thirty-ninth preset torque;
  determine the tenth mode as the next operation mode if the current state of charge is less than the eighth preset state of charge threshold and the expected torque at wheels is greater than a fortieth preset torque;
  wherein the fifth preset state of charge threshold is greater than the sixth preset state of charge threshold, the seventh preset state of charge threshold is greater than the eighth preset state of charge threshold; the twenty-first preset torque is less than the twenty-second preset torque, the twenty-third preset torque is less than the twenty-fourth preset torque, the twenty-fifth preset torque is less than the twenty-sixth preset torque, the twenty-seventh preset torque is less than the twenty-eighth preset torque, the twenty-ninth preset torque is less than the thirtieth preset torque, the thirty-first preset torque is less than the thirty-second preset torque, the thirty-third preset torque is less than the thirty-fourth preset torque, the thirty-fifth preset torque is less than the thirty-sixth preset torque, the thirty-seventh preset torque is less than the thirty-eighth preset torque, and the thirty-ninth preset torque is less than the fortieth preset torque.

21. The hybrid electric vehicle according to claim 20, wherein the fifth preset state of charge threshold, the sixth preset state of charge threshold, the seventh preset state of charge threshold and the eighth preset state of charge threshold are respectively determined according to a capacity and a type of the power battery in the four-wheel drive hybrid electric vehicle;
  wherein the twenty-first preset torque, the twenty-second preset torque, the twenty-third preset torque, the twenty-fourth preset torque, the twenty-fifth preset torque, the twenty-sixth preset torque, the twenty-seventh preset torque, the twenty-eighth preset torque, the twenty-ninth preset torque, the thirtieth preset torque, the thirty-first preset torque, the thirty-second preset torque, the thirty-third preset torque, the thirty-fourth preset torque, the thirty-fifth preset torque, the thirty-sixth preset torque, the thirty-seventh preset torque, the thirty-eighth preset torque, the thirty-ninth preset torque and the fortieth preset torque are respectively determined by performing an actual vehicle calibration according to maximum torque characteristics of the rear-wheel drive motor, a wheel radius, a transmission efficiency, each gear ratio and a speed ratio of a main reducer.

* * * * *